US006853960B2

United States Patent
Yamanaka et al.

(10) Patent No.: US 6,853,960 B2
(45) Date of Patent: Feb. 8, 2005

(54) COMMUNICATIONS APPARATUS, COMMUNICATION SYSTEM, PLUG-IN MODULE CONTROL METHOD, AND COMPUTER-READABLE RECORDING MEDIUM WHERE PROGRAM FOR EXECUTING BY COMPUTER IS RECORDED

(75) Inventors: Hiroshi Yamanaka, Tokyo (JP); Yoichiro Tomari, Tokyo (JP); Masashi Saito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/314,958

(22) Filed: Dec. 10, 2002

(65) Prior Publication Data

US 2003/0200061 A1 Oct. 23, 2003

(30) Foreign Application Priority Data

Apr. 22, 2002 (JP) ........................................ 2002-118689

(51) Int. Cl.[7] .............................................. G06F 19/00
(52) U.S. Cl. ...................................... 702/188; 707/102
(58) Field of Search ........................... 702/188; 707/102, 707/103 R, 2, 10; 710/17

(56) References Cited

U.S. PATENT DOCUMENTS 5,903,728 A * 5/1999 Semenzato .................. 709/217
6,026,440 A * 2/2000 Shrader et al. .............. 709/224
6,216,152 B1   4/2001 Wong et al.
6,314,565 B1 * 11/2001 Kenner et al. .............. 717/171
6,389,538 B1 * 5/2002 Gruse et al. ................ 713/194
6,604,106 B1 * 8/2003 Bodin et al. ................ 707/101
6,604,143 B1 * 8/2003 Nagar et al. ................ 709/229
6,651,084 B1 * 11/2003 Kelley et al. ............... 709/202
6,691,176 B1 * 2/2004 Narin et al. ................ 719/318

FOREIGN PATENT DOCUMENTS

| GB | 2 340 276 A | 2/2000 |
| GB | 2 347 766 A | 9/2000 |
| JP | 10-124415 A | 5/1998 |
| JP | 11-024922 | 1/1999 |
| JP | 11-102289 | 4/1999 |
| JP | 11-259304 | 9/1999 |
| JP | 11-338666 | 12/1999 |
| JP | 2000-298567 | 10/2000 |
| JP | 2001-142711 A | 5/2001 |
| JP | 2001-175377 A | 6/2001 |

* cited by examiner

Primary Examiner—Edward Raymond
(74) Attorney, Agent, or Firm—Birch, Stewart, Kolasch & Birch, LLP

(57) ABSTRACT

A communications apparatus includes a required plug-in judgement unit for judging a plug-in module required for specific contents, and a plug-in deletion unit, when a specific amount of a memory storage, whose capacity is the specific amount and which has stored a specific plug-in module, is insufficient to further store the plug-in module judged by the required plug-in judgement unit, the plug-in deletion unit for deleting the specific plug-in module having been stored in the memory storage.

34 Claims, 15 Drawing Sheets

COMMUNICATIONS APPARATUS, COMMUNICATION SYSTEM, PLUG-IN MODULE CONTROL METHOD, AND COMPUTER-READABLE RECORDING MEDIUM WHERE PROGRAM FOR EXECUTING BY COMPUTER IS RECORDED

BACKGROUND OF THE INVENTION

1. Field of the Invention

The present invention relates to a browser which realizes to expand various embedding data processing functions by using a plug-in system. The present invention also relates to a communications apparatus using a plug-in system. Moreover, the present invention relates to a plug-in module control method using a plug-in system.

2. Description of the Related Art

In the browser, various embedding data exists in the contents to display, and a plug-in system is used to perform processing corresponding to each data form of the various data. In the plug-in system, a specific data form is associated with a plug-in module for processing the specific data form. The processing is executed by judging a data form to be processed by a browser and by calling a plug-in module corresponding to the data form.

Regarding the plug-in system, the technology of the plug-in automatic re-configuration has been disclosed in which a plug-in module is not added to a browser in advance, but a plug-in module is downloaded when necessary in order to add a function. As an example, Japanese Unexamined Patent Publications JP2001-142711, JP10-124415, and JP2001-175377 can be cited. In the Japanese Unexamined Patent Publication JP2001-142711, it is described about a configuration of a browser for built-in equipment, where a plug-in module to be added is searched and called when a browser finds designation of the plug-in module in analyzing contents received from the outside. Moreover, it is described in Japanese Unexamined Patent Publication JP10-124415 about a way of acquiring a parameter for browser extension based on a tag specified in the contents and installing a required plug-in module by dynamically searching a network. In the Japanese Unexamined Patent Publication JP2001-175377, it is described about a way of reconfiguring a form and a function of a browser by checking whether required information exits in a terminal or not based on a script written in the contents and downloading data when necessary.

PROBLEMS TO BE SOLVED BY THE INVENTION

However, in the Japanese Unexamined Patent Publications JP2001-142711, JP10-124415, and JP2001-175377, although adding a plug-in module for expanding a browser function is described, it is not described about deleting a plug-in module. Generally, since H/W resource in built-in equipment is a little, resource assigned for downloading and managing a plug-in module is also limited. Therefore, because of the resource shortage, it becomes impossible to newly add a required plug-in module by depending upon the method of merely adding plug-in modules according to the demand.

SUMMARY OF THE INVENTION

It is one of objects of the present invention to provide a plug-in automatic reconfiguration in which a little resource is effectively utilized.

A communications apparatus according to one aspect of the present invention includes:

a plug-in judgement unit for judging a plug-in module required for specific contents; and a plug-in deletion unit, when a specific amount of a memory storage, whose capacity is the specific amount and which has stored a specific plug-in module, is insufficient to further store the plug-in module judged by the plug-in judgement unit, the plug-in deletion unit for deleting the specific plug-in module having been stored in the memory storage.

A communications apparatus according to another aspect of the present invention includes:

a plug-in judgement unit for judging a plug-in module required for specific contents;

a plug-in deletion unit, when a specific amount of a memory storage, whose capacity is the specific amount and which has stored a specific plug-in module, is insufficient to further store the plug-in module judged by the plug-in judgement unit, the plug-in deletion unit for deleting the specific plug-in module having been stored in the memory storage;

a plug-in input unit for inputting the plug-in module judged by the plug-in judgement unit to be stored in the memory storage where the specific plug-in module has been deleted by the plug-in deletion unit in order to have an empty space for storing the plug-in module input by the plug-in input unit; and a plug-in input fee charge unit for charging a fee when the plug-in module is input by the plug-in input unit.

A plug-in module control method according to another aspect of the present invention includes:

judging a plug-in module required for specific contents; and deleting a specific plug-in module having been stored in a memory storage, when a specific amount of the memory storage, whose capacity is the specific amount and which has stored the specific plug-in module, is insufficient to further store the plug-in module judged through the judging.

A computer-executable program according to another aspect of the present invention includes the processes of:

judging a plug-in module required for specific contents; and deleting a specific plug-in module having been stored in a memory storage, when a specific amount of the memory storage, whose capacity is the specific amount and which has stored the specific plug-in module, is insufficient to further store the plug-in module judged through the process of judging.

A computer-readable storage medium having a computer-executable program, according to another aspect of the present invention, includes the processes of:

judging a plug-in module required for specific contents; and deleting a specific plug-in module having been stored in a memory storage, when a specific amount of the memory storage, whose capacity is the specific amount and which has stored the specific plug-in module, is insufficient to further store the plug-in module judged through the process of judging.

The above-mentioned and other objects, features, and advantages of the present invention will be made more apparent by reference to the following detailed description when taken in conjunction with the accompanying drawings.

DETAILED DESCRIPTION OF THE PREFERRED EMBODIMENTS

Embodiments of a plug-in automatic reconfiguration unit, and an apparatus and a system including the plug-in automatic reconfiguration unit will be described hereinafter.

Embodiment 1

Figure 1:
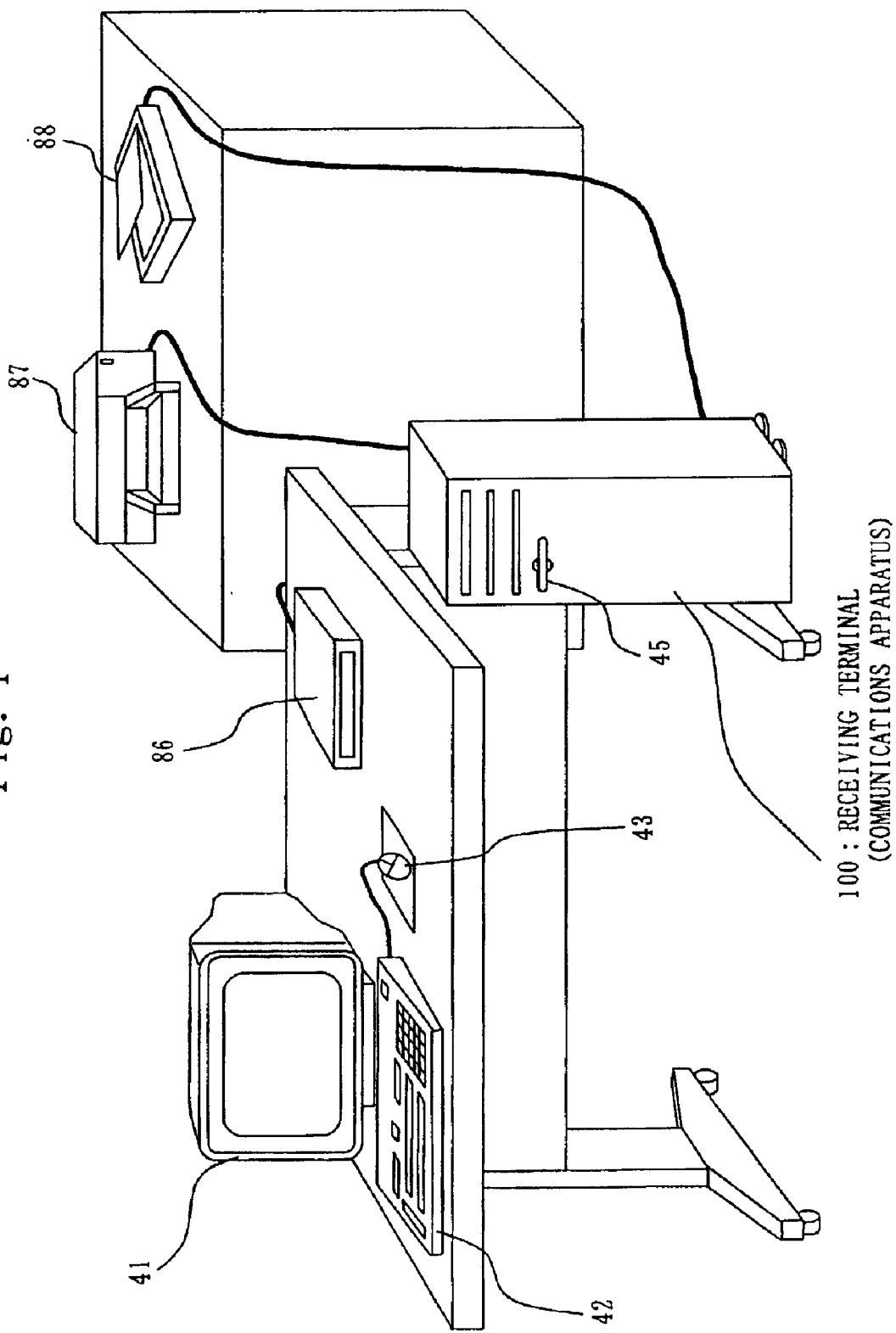
FIG. 1 shows an appearance of a communications apparatus according to Embodiment 1.

FIG. 1 shows an appearance of a communications apparatus according to Embodiment 1. In FIG. 1, the following are provided: a receiving terminal 100 being a personal computer (PC) (an example of the communications apparatus), a CRT (Cathode Ray Tube) display apparatus 41, a keyboard (K/B) 42, a mouse 43, a compact disc device (CDD) 86, a printer 87, and a scanner 88. The CRT display apparatus 41, the K/B 42, the mouse 43, the CDD 86, the printer 87, and the scanner 88 are connected to the receiving terminal 100 through the cables.

Figure 2:
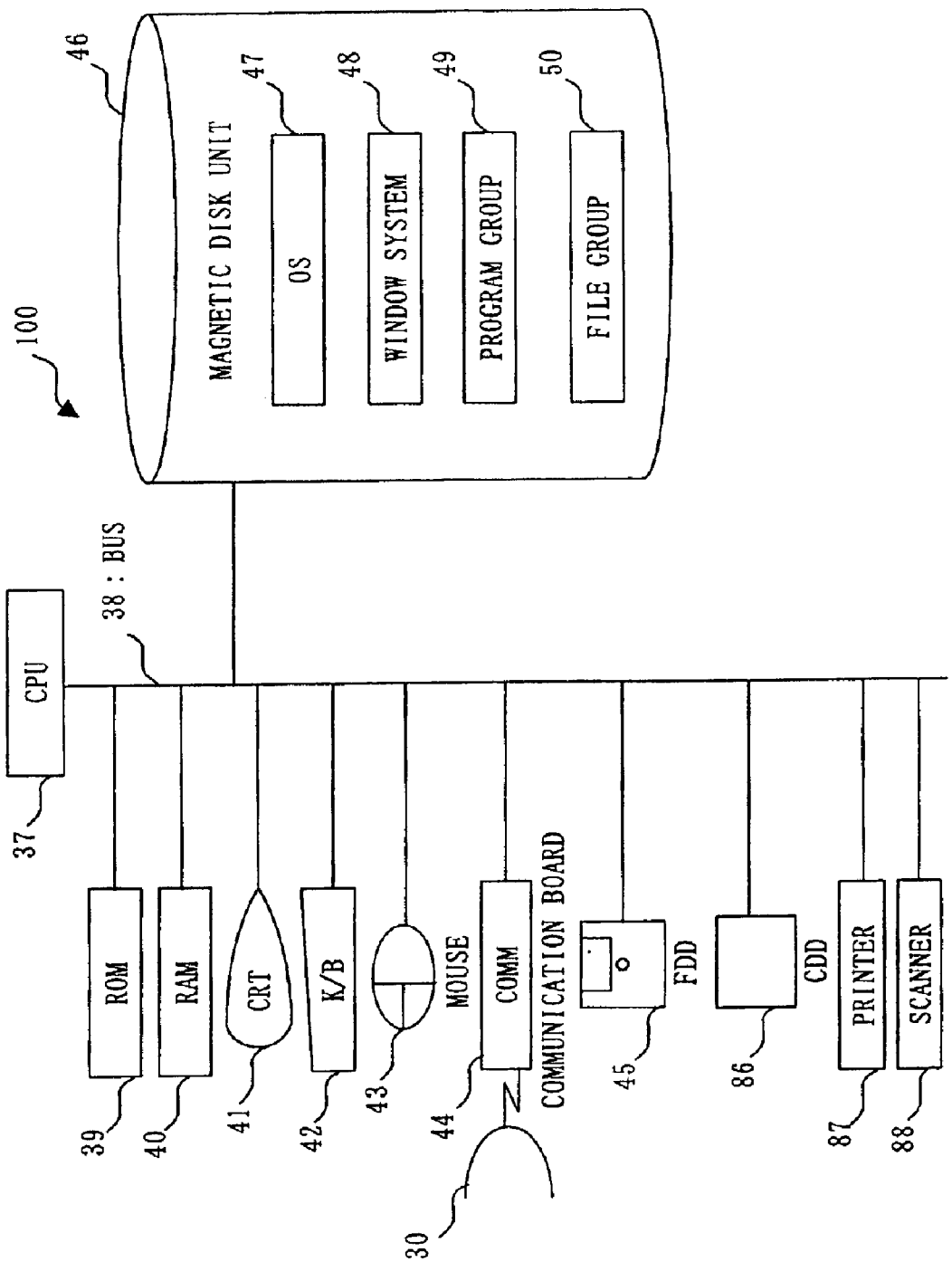
FIG. 2 shows a hardware configuration of the communications apparatus according to Embodiment 1.

FIG. 2 shows a hardware configuration of the communications apparatus according to Embodiment 1. In FIG. 2, the following are provided: the Internet 30, a CPU (Central Processing Unit) 37, a bus 38, a ROM (Read Only Memory) 39, a RAM (Random Access Memory) 40, a communication board 44, a FDD (Flexible Disc Drive) 45, a magnetic disc unit 46, an operating system (OS) 47, a window system 48, a program group 49, and a file group 50.

The CPU 37 which executes programs is connected to the ROM 39, the RAM 40, the CRT display apparatus 41, the K/B 42, the mouse 43, the communication board 44, the FDD 45, the magnetic disc unit 46, the CDD 86, the printer 87, and the scanner 88 through the bus 38. The communication board 44 is connected to the Internet 30. The communication board 44 can be connected not only to the Internet 30 but also to a LAN (Local Area Network) or a WAN (Wide Area Network) such as ISDN. In the magnetic disc unit 46, the OS 47, the window system 48, the program group 49, and the file group 50 are stored. The program group 49 is executed by the CPU 37, the OS 47, and the window system 48.

Figure 3:
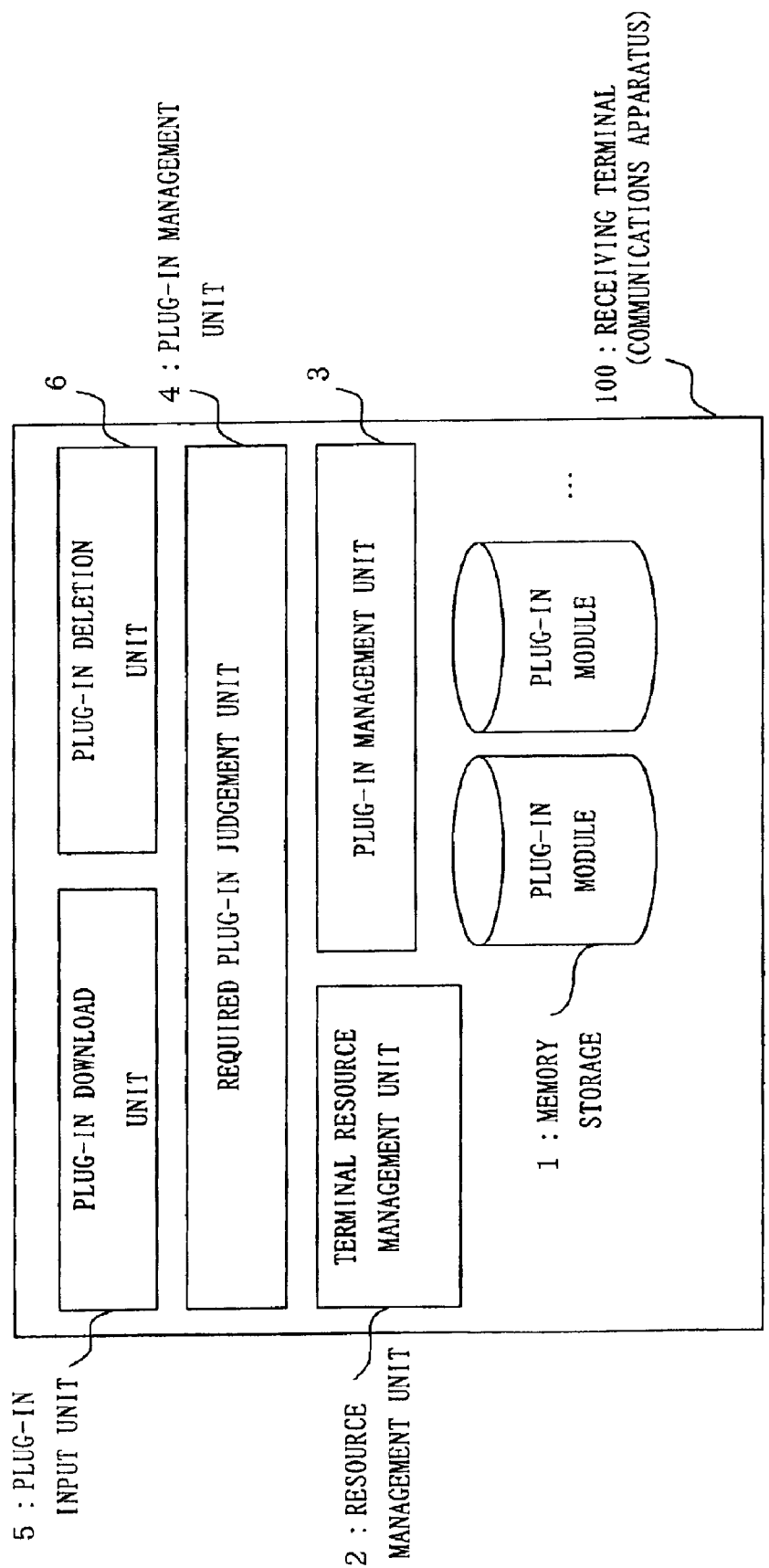
FIG. 3 is a block diagram showing an example of a configuration of a plug-in automatic reconfiguration unit according to Embodiment 1.

FIG. 3 is a block diagram showing an example of a structure of a plug-in automatic reconfiguration unit according to Embodiment 1. In FIG. 3, the following are provided: a memory storage 1, a terminal resource management unit 2 (an example of a resource management unit), a plug-in management unit 3 (an example of a plug-in management unit), a required plug-in judgement unit 4 (an example of a plug-in judgement unit), a plug-in download unit 5 (an example of a plug-in input unit) and a plug-in deletion unit 6 (an example of a plug-in deletion unit). The receiving terminal 100 includes the terminal resource management unit 2, the plug-in management unit 3, the required plug-in judgement unit 4, the plug-in download unit 5, and the plug-in deletion unit 6.

The memory storage 1 stores plug-in modules to be required when a browser processes data having a specific form. The number of the plug-in modules which can exist in the memory storage 1 is zero or greater than zero. The terminal resource management unit 2 manages resource information necessary for downloading a plug-in module to the receiving terminal 100 and managing the downloaded plug-in module. The plug-in management unit 3 manages plug-in modules being in the receiving terminal. The required plug-in judgement unit 4 judges a plug-in module required for displaying received contents and its embedding data. The plug-in download unit 5 downloads a module file concerning a plug-in module necessary for displaying received contents and can acquire file size information concerning the plug-in module. The plug-in deletion unit 6 judges whether terminal resources are sufficient or not at the time of downloading a new required plug-in module, and deletes suitable unnecessary plug-in modules when it is judged that the terminal resources are insufficient.

An example of the operation will now be explained referring to FIG. 3. When a browser receives contents, the required plug-in judgement unit 4 judges all plug-in modules required for displaying the received contents and its embedding data by way of analyzing description of the received contents. Details of this judgment processing are not especially described in this document because the method of this judgment processing is the same as that stated in Japanese Unexamined Patent Publication JP2001-142711, Japanese Unexamined Patent Publication JP10-124415, etc. When the required plug-in judgement unit 4 understands what plug-in module is required, the required plug-in judgement unit 4 checks the plug-in management unit 3 to know if the required plug-in module exists in the receiving terminal. When exists, the required plug-in module is called and data processing corresponding to the required plug-in module is executed. When the required plug-in module does not exist, file size information on the required plug-in module is acquired by using the plug-in download unit 5. The acquired file size information is transmitted to the plug-in deletion unit 6. The plug-in deletion unit 6 checks the terminal resource management unit 2 to know if there is an empty (unused) space of the H/W (hardware) resource (an example of a specific amount) for the newly downloaded plug-in module. When there is an empty H/W resource, the plug-in download unit 5 starts to download the plug-in module file. When the download is completed, the downloaded plug-in module file is registered in the plug-in management unit 3 and data processing corresponding to the plug-in is executed. When there is no empty H/W resource, the plug-in deletion unit 6 checks the required plug-in judgement unit 4 and the plug-in management unit 3 in order to delete a plug-in module which is unnecessary for displaying the received contents and its embedding data. The deletion is performed for unnecessary plug-in modules one by one, and the deletion is stopped at the time when the space of the HUV resource for the plug-in module to be newly downloaded has been secured. When the H/W resource space has been secured, the plug-in download unit 5 starts to download the plug-in module file. Then, when the download is completed, the downloaded plug-in module file is registered in the plug-in management unit 3 and data processing corresponding to the plug-in is executed. By dint of the above operation, the plug-in automatic reconfiguration unit efficiently utilizing a limited H/W resource to the maximum can be provided.

The receiving terminal 100 is not limited to the personal computer (PC). For example, built-in equipment, such as a cellular phone, a car-navigation system, and a PDA (personal digital assistant), can be the receiving terminal 100. Moreover, it is also acceptable to use a computer program utilized for a browser, as each unit mentioned above.

As mentioned above, the browser being a computer program according to Embodiment 1 realizes to expand various embedding data processing functions by using the plug-in system. The browser includes the plug-in automatic reconfiguration unit which has the following:

the terminal resource management unit 2 for managing resource information necessary for downloading a plug-in module to the receiving terminal and managing the downloaded plug-in module, the plug-in management unit 3 for managing plug-in modules existing in the receiving terminal, the required plug-in judgement unit 4 for judging a plug-in module required for displaying received contents, the plug-in download unit 5 for downloading a module file concerning the plug-in module necessary for displaying the received contents or acquiring file size information concerning the plug-in module, and the plug-in deletion unit 6 for judging whether terminal resources are sufficient or not at the time of downloading a new required plug-in module, and selecting and deleting a suitable unnecessary plug-in module when it is judged that the terminal resources are insufficient.

The communications apparatus according to Embodiment 1 is the receiving terminal 100 where a browser having the above-mentioned plug-in automatic reconfiguration unit is installed.

Namely, the communications apparatus according to Embodiment 1 includes:

a plug-in judgement unit for judging a plug-in module required for specific contents; and a plug-in deletion unit, when a specific amount of a memory storage, whose capacity is the specific amount and which has stored a specific plug-in module, is insufficient to further store the plug-in module judged by the plug-in judgement unit, the plug-in deletion unit deletes the specific plug-in module having been stored in the memory storage.

Further, the communications apparatus includes:

a resource management unit for managing the specific amount of the memory storage, and a plug-in management unit for managing the specific plug-in module having been stored in the memory storage, wherein the plug-in deletion unit deletes the specific plug-in module having been stored in the memory storage, based on the specific amount of the memory storage managed by the resource management unit and on the specific plug-in module managed by the plug-in management unit.

Further, the communications apparatus includes:

a plug-in input unit for inputting the plug-in module judged by the plug-in judgement unit to be stored in the memory storage where the specific plug-in module has been deleted by the plug-in deletion unit in order to have an empty space for storing the input plug-in module.

Furthermore, the plug-in input unit registers the input plug-in module in the plug-in management unit, and the plug-in management unit manages the registered plug-in module registered by the plug-in input unit.

Namely, a plug-in module control method according to Embodiment 1 includes the steps of:

a plug-in judgement step for judging a plug-in module required for specific contents; and a plug-in deletion step, when a specific amount of a memory storage, whose capacity is the specific amount and which has stored a specific plug-in module, is insufficient to further store the plug-in module judged through the plug-in judgement step, the plug-in deletion step for deleting the specific plug-in module having been stored in the memory storage.

Namely, a computer-executable program according to Embodiment 1 includes the processes of:

a plug-in judgement process for judging a plug-in module required for specific contents; and a plug-in deletion process, when a specific amount of a memory storage, whose capacity is the specific amount and which has stored a specific plug-in module, is insufficient to further store the plug-in module judged through the plug-in judgement process, the plug-in deletion process for deleting the specific plug-in module having been stored in the memory storage.

Namely, according to Embodiment 1, a computer-readable storage medium storing a computer-executable program includes the processes of:

a plug-in judgement process for judging a plug-in module required for specific contents; and a plug-in deletion process, when a specific amount of a memory storage, whose capacity is the specific amount and which has stored a specific plug-in module, is insufficient to further store the plug-in module judged through the plug-in judgement process, the plug-in deletion process for deleting the specific plug-in module having been stored in the memory storage.

Embodiment 2

Although the plug-in deletion unit 6 according to Embodiment 1 deletes unnecessary plug-in modules, there might be important plug-in modules and unimportant plug-in modules in the unnecessary ones. If an important (often used) plug-in module has been deleted, the case in need of re-downloading the deleted plug-in module in order to display other contents will increase, which is very inefficient. Then, the importance of an unnecessary plug-in module is determined in Embodiment 2 as follows:

Each configuration is the same as that of Embodiment 1. First, the plug-in management unit 3 manages plug-in modules and each plug-in module's last use date/time at which each plug-in module was called through a browser processing. When plug-in A and plug-in B become candidates to be deleted, the plug-in deletion unit 6 compares the last use date/time Ta of the plug-in A with the last use date/time Tb of the plug-in B. If the last date/time Ta is prior to the last date/time Tb, deletion priority of the plug-in A is heightened, and if the last date/time Tb is prior to the last date/time Ta, deletion priority of the plug-in B is heightened. Then, deletion is executed for plug-in modules depending upon the priorities in order from high to low. By dint of the above operation, for example, it is possible to perform the deletion in order starting from the plug-in module whose last use date/time was more than one year ago and which is not to be used from now on. Therefore, the times of re-downloading plug-in modules can be reduced.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

As mentioned above, the plug-in management unit 3 and the plug-in deletion unit 6 included in the plug-in automatic reconfiguration unit according to Embodiment 2 have the following features:

the plug-in management unit 3 manages each plug-in module's last use date/time at which each plug-in module was used, and the plug-in deletion unit 6 gives a deletion priority from high to low in order starting from the module whose last use date/time is the oldest, based on each plug-in module's last use date/time.

The communications apparatus according to Embodiment 2 is the receiving terminal 100 where a browser having the above-mentioned plug-in automatic reconfiguration unit is installed.

Namely, the plug-in management unit and the plug-in deletion unit included in the communications apparatus according to Embodiment 2 have the following features:

the plug-in management unit manages a plurality of plug-in modules and their last use dates/time, and the plug-in deletion unit selects a plurality of plug-in modules differing from the plug-in module judged by the plug-in judgement unit, out of the plurality of plug-in modules managed by the plug-in management unit, and deletes a plug-in module in order of deletion priority starting from the module whose last use date/time is the oldest, out of the selected plurality of plug-in modules.

Embodiment 3

Although importance of plug-in is judged by using the last use date/time in Embodiment 2, it might be difficult to judge the importance based on the last use date/time. For example, it is assumed concerning the plug-in A and the plug-in B that the plug-in A is often used in various contents and the plug-in B is not used so often as the plug-in A. If, by chance, the plug-in B was used in the contents displayed just now, the last use date/time of the plug-in B becomes newer than that of the plug-in A. In this case, when both the plug-in A and the plug-in B become deletion candidates, the plug-in A is deleted prior to the plug-in B in Embodiment 2. However, there may be a case that it is better to leave the plug-in A which is often used. Then, according to Embodiment 3, the importance of an unnecessary plug-in module is determined as stated below.

Each configuration is the same as that of Embodiment 1. First, the plug-in management unit 3 manages plug-in modules and each plug-in module's call times indicating the times of each plug-in module being called through a browser processing. The call times shows the number of use times (an example of frequency of use) of a plug-in module. When the plug-in A and the plug-in B become candidates to be deleted, the plug-in deletion unit 6 compares a use times Na of the plug-in A with a use times Nb of the plug-in B. If Na is smaller than Nb, deletion priority of the plug-in A is heightened, and if Nb is smaller than Na, deletion priority of the plug-in B is heightened. Then, deletion is executed for plug-in modules depending upon the priorities in order from high to low. By dint of the above operation, for example, it is possible to perform the deletion in order starting from the plug-in module whose use times is the fewest and which is rarely to be used from now on. Therefore, the times of re-downloading plug-in modules can be reduced.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

As mentioned above, the plug-in management unit 3 and the plug-in deletion unit 6 included in the plug-in automatic reconfiguration unit according to Embodiment 3 have the following features:

the plug-in management unit 3 manages use times of each plug-in module indicating the times of each plug-in module being used, and the plug-in deletion unit 6 gives a deletion priority from high to low in order starting from the module whose use times is the fewest, based on each plug-in module's use times.

The communications apparatus according to Embodiment 3 is the receiving terminal 100 where a browser having the above-mentioned plug-in automatic reconfiguration unit is installed.

Namely, the plug-in management unit and the plug-in deletion unit included in the communications apparatus according to Embodiment 3 have the following features:

the plug-in management unit manages a plurality of plug-in modules and their use frequencies, and the plug-in deletion unit selects a plurality of plug-in modules differing from the plug-in module judged by the plug-in judgement unit, out of the plurality of plug-in modules managed by the plug-in management unit, and deletes a plug-in module in order of deletion priority starting from the module whose use frequency is the lowest, out of the selected plurality of plug-in modules.

Embodiment 4

Although importance of plug-in is judged by using a use frequency in Embodiment 3, it might be difficult to judge the importance based on the use frequency. For example, when a user had frequently used the Internet service of music one month ago and recently uses the service of animation frequently, it can be considered that the importance of plug-in of animation is increasing recently. Then, according to Embodiment 4, the importance of an unnecessary plug-in module is determined as stated below.

Each configuration is the same as that of Embodiment 1. First, the plug-in management unit 3 manages plug-in modules and each plug-in module's call times during the past one month indicating the times of each plug-in module being called through a browser processing during the past one month. The call times during the past one month shows the number of use times (use times with a term limit, which is an example of a use frequency during a specific term) of a plug-in module. When the plug-in A and the plug-in B become candidates to be deleted, the plug-in deletion unit 6 compares a use times Na with a term limit of the plug-in A and a use times Nb with a term limit of the plug-in B. If Na is smaller than Nb, deletion priority of the plug-in A is heightened, and if Nb is smaller than Na, deletion priority of the plug-in B is heightened. Then, deletion is executed for plug-in modules depending upon the priorities in order from high to low. Although the past one month is stated as an example of a term limit of the use times, it is also acceptable to arbitrarily set up the term limit as one year, one week, etc. By dint of the above operation, it is possible to perform the deletion in order starting from the plug-in module whose use times during a specific term is the fewest and which is rarely to be used from now on. Therefore, the times of re-downloading plug-in modules can be reduced.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

As mentioned above, the plug-in management unit 3 and the plug-in deletion unit 6 included in the plug-in automatic reconfiguration unit according to Embodiment 4 have the following features:

the plug-in management unit 3 manages use times with a term limit of each plug-in module indicating the times of each plug-in module being used during a specific term from the present back to the past, and the plug-in deletion unit 6 gives a deletion priority from high to low in order starting from the module whose use times with a term limit is the fewest, based on each plug-in module's use times with a term limit.

The communications apparatus according to Embodiment 4 is the receiving terminal 100 where a browser having the above-mentioned plug-in automatic reconfiguration unit is installed.

Namely, the plug-in management unit and the plug-in deletion unit included in the communications apparatus according to Embodiment 4 have the following features:

the plug-in management unit manages a plurality of plug-in modules and their use frequencies during a specific term, and the plug-in deletion unit selects a plurality of plug-in modules differing from the plug-in module judged by the plug-in judgement unit, out of the plurality of plug-in modules managed by the plug-in management unit, and deletes a plug-in module in order of deletion priority starting from the module whose use frequency during the specific term is the lowest, out of the selected plurality of plug-in modules.

Embodiment 5

In order to enhance the efficiency of the plug-in automatic reconfiguration, it can be considered as follows: If once plug-in module A is deleted, it is necessary to re-download the plug-in module A when it becomes required again. The fewer the number of modules to be deleted becomes, the fewer the times of re-downloading the modules becomes. Then, according to Embodiment 5, deletion priority of an unnecessary plug-in module is determined as stated below. Each configuration is the same as that described in Embodiment 1.

The plug-in deletion unit 6 creates a group of deletion candidates (modules) based on a certain predetermined deletion priority standard (for example, the deletion priority standard described in Embodiment 2, 3, or 4). Suppose, for example, that deletion candidate groups S1 and S2 are created. The plug-in deletion unit 6 selects one of the groups S1 and S2 which has the fewer elements (the plug-in modules in the group), and deletes the selected group.

As a way of creating a deletion candidate group having the fewest elements, it is easy to add plug-in modules to the deletion candidate group in order based on priority regarding plug-in module size from large to small, starting from a plug-in module having the largest module file size (an example of the capacity of a plug-in module). In Embodiment 5, it is acceptable to delete a group created by this easy way or to delete a group having the fewest elements (an example of a group composed of small number of plug-in modules), out of some deletion candidate groups created based on other deletion priority standards. By dint of this operation, the number of plug-in modules to be deleted can be as small as possible, and the times of re-downloading plug-in modules can be reduced.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

As described above, the plug-in deletion unit 6 included in the plug-in automatic reconfiguration unit according to Embodiment 5 has the following feature:

Taking a total size of plug-in module group to be newly downloaded into account, the plug-in deletion unit 6 determines a deletion object (that is a plug-in module to be deleted) so that the number of plug-in modules to be deleted can be as small as possible.

The communications apparatus according to Embodiment 5 is the receiving terminal 100 where a browser having the above-stated plug-in automatic reconfiguration unit is installed.

Then, the plug-in management unit and the plug-in deletion unit according to Embodiment 5 have the following features:

the plug-in management unit manages a plurality of plug-in modules and their amounts, and the plug-in deletion unit selects a plurality of plug-in modules differing from the plug-in module judged by the plug-in judgement unit, out of the plurality of plug-in modules managed by the plug-in management unit, and deletes plug-in modules in order based on priority regarding amount from large to small, starting from the plug-in module having the largest amount, out of the selected plurality of plug-in modules.

Namely, the plug-in management unit and the plug-in deletion unit included in the communications apparatus according to Embodiment 5 have the following features:

The plug-in management unit manages a plurality of plug-in modules, and their last use dates/time, their use frequencies, and their use frequencies during a specific term.

Out of the plurality of plug-in modules which is managed by the plug-in management unit and differs from the plug-in module judged by the plug-in judgement unit, the plug-in deletion unit selects a group composed of at least one plug-in module whose last use date/time is old based on priority regarding last use date/time from old to new, a group composed of at least one plug-in module whose use frequency is low based on priority regarding use frequency from low to high, and a group composed of at least one plug-in module whose use frequency during a specific term is low based on priority regarding use frequency during the specific term from low to high.

Then, out of the above selected plug-in modules, the plug-in deletion unit selects a group composed of at least one plug-in module whose last use date/time is older than that of a specified plug-in module, a group composed of at least one plug-in module whose use frequency is lower than that of the specified plug-in module, and a group composed of at least one plug-in module whose use frequency during a specific term is lower than that of the specified plug-in module. The plug-in module judged by the plug-in judgement unit can be used as the specified plug-in module, or it is acceptable to regard other plug-in module as the specified plug-in module.

Out of the above selected groups, the plug-in deletion unit deletes a group having the smallest number of plug-in modules, with giving a first deletion priority to the group.
Embodiment 6

In order to enhance the efficiency of the plug-in automatic reconfiguration, it can be considered as follows: The smaller the total size of modules to be deleted is, the less the network load at the time of re-downloading the modules and the time required for re-downloading the modules become. Then, according to Embodiment 6, deletion priority of an unnecessary plug-in module is determined as stated below. Each configuration is the same as that described in Embodiment 1.

The plug-in deletion unit 6 creates a group of deletion candidates (modules) based on a certain predetermined deletion priority standard (for example, the deletion priority standard described in Embodiment 2, 3, or 4). Suppose, for example, that deletion candidate groups S1 and S2 are created. The plug-in deletion unit 6 selects one of the groups S1 and S2 which has the smaller total size (amount) of module files, and deletes the selected group.

As a way of creating a deletion candidate group having the smallest total size, it is easy to add plug-in modules to the deletion candidate group in order based on priority regarding plug-in module file size from small to large, starting from a plug-in module having the smallest module file size. In Embodiment 6, it is acceptable to delete a group created by this easy way or to delete a group having the smallest total size, out of some deletion candidate groups created based on other deletion priority standards. By dint of this operation, the total size of plug-in module files to be deleted can be as small as possible, and a network load at the time of re-downloading the plug-in modules and time required for re-downloading the plug-in modules can be reduced.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

Namely, the plug-in deletion unit 6 included in the plug-in automatic reconfiguration unit according to Embodiment 6 has the following feature:

Taking a total size of plug-in module group to be newly downloaded into account, the plug-in deletion unit 6 determines a deletion object (that is a plug-in module group to be deleted) so that the total size (amount) of files of the plug-in module group to be deleted can be as small as possible.

The communications apparatus according to Embodiment 6 is the receiving terminal 100 where a browser having the above-mentioned plug-in automatic reconfiguration unit is installed.

Namely, the plug-in management unit and the plug-in deletion unit included in the communications apparatus according to Embodiment 6 have the following features:

The plug-in management unit manages a plurality of plug-in modules and their last use dates/time, their use frequencies, their use frequencies during a specific term, and their amounts.

Out of the plurality of plug-in modules which is managed by the plug-in management unit and differs from the plug-in module judged by the plug-in judgement unit, the plug-in deletion unit selects a plurality of plug-in modules whose last use dates/time are old based on priority regarding last use date/time from old to new, a plurality of plug-in modules whose use frequencies are low based on priority regarding use frequency from low to high, and a plurality of plug-in modules whose use frequencies during a specific term are low based on priority regarding use frequency during the specific term from low to high.

Then, the plug-in deletion unit deletes a plurality of plug-in modules having the smallest total amount, with giving them deletion priority, out of the above plurality of plug-in modules whose last use dates/time are old selected based on priority regarding last use date/time, the above plurality of plug-in modules whose use frequencies are low selected based on priority regarding use frequency, and the above plurality of plug-in modules whose use frequencies during a specific term are low selected based on priority regarding use frequency during the specific term.
Embodiment 7

In determining the priority of plug-in module deletion, it can be considered as follows: If once plug-in module A is deleted, it is necessary to re-download the plug-in module A when it becomes required again. The shorter the time required for re-downloading a plug-in module is, the better the operation feeling of the user becomes. (Generally, time required for downloading would often depend upon a size of a module file to be downloaded. However, the time required for download sometimes depends upon other factors such as performance of a server providing plug-in modules.) Then, according to Embodiment 7, deletion priority of an unnecessary plug-in module is determined as stated below.

Each configuration is the same as that of Embodiment 1. First, the plug-in management unit 3 manages plug-in modules and their time required for downloading, called download time hereinafter, (an example of time required for inputting, called input time hereinafter).

When plug-in A and plug-in B become candidates to be deleted, the plug-in deletion unit 6 compares download time Ta of the plug-in A with download time Tb of the plug-in B. If Ta is smaller than Tb, deletion priority of the plug-in A is heightened, and if Tb is smaller than Ta, deletion priority of the plug-in B is heightened. Then, deletion is executed for plug-in modules depending upon the priorities in order from high to low. By dint of the above operation, it is possible to perform the deletion in order starting from the plug-in module whose download time is the shortest. Therefore, time required for re-downloading plug-in modules can be reduced.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

As mentioned above, the plug-in management unit 3 and the plug-in deletion unit 6 included in the plug-in automatic reconfiguration unit according to Embodiment 7 have the following features:

the plug-in management unit 3 manages each plug-in module's download time, and the plug-in deletion unit 6 gives a deletion priority from high to low in order starting from the module whose download time is the shortest, based on each plug-in module's download time.

The communications apparatus according to Embodiment 7 is the receiving terminal 100 where a web-browser having the above-mentioned plug-in automatic reconfiguration unit is installed.

Namely, the plug-in management unit and the plug-in deletion unit included in the communications apparatus according to Embodiment 7 have the following features:

the plug-in management unit manages a plurality of plug-in modules and their input time, and the plug-in deletion unit selects a plurality of plug-in modules differing from the plug-in module judged by the plug-in judgement unit, out of the plurality of plug-in modules managed by the plug-in management unit, and deletes a plug-in module in order of deletion priority starting from the plug-in module whose input time is the shortest, out of the selected plurality of plug-in modules.

Embodiment 8

In determining the priority of plug-in module deletion, it can be considered as follows: If once plug-in module A is deleted, it is necessary to re-download the plug-in module A when it becomes required again. Depending upon a money charge system in the computer system, it may charge for network use or charge a plug-in module itself at the time of downloading. In such a system where a fee is charged at the time of re-downloading, the lower the fee at the re-download is, the better for the user. Then, according to Embodiment 8, deletion priority of an unnecessary plug-in module is determined as stated below.

Each configuration is the same as that of Embodiment 1.

First, the plug-in management unit 3 manages plug-in modules and their fees required for downloading, called a download fee hereinafter, (an example of a required fee). When plug-in A and plug-in B become candidates to be deleted, the plug-in deletion unit 6 compares download fee Ma of the plug-in A with download fee Mb of the plug-in B. If Ma is smaller than Mb, deletion priority of the plug-in A is heightened, and if Mb is smaller than Ma, deletion priority of the plug-in B is heightened. Then, deletion is executed for plug-in modules depending upon the priorities in order from high to low. By dint of the above operation, it is possible to perform the deletion in order starting from the plug-in module whose download fee is the lowest. Therefore, the fee required at the time of plug-in module re-downloading can be reduced.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

As mentioned above, the plug-in management unit 3 and the plug-in deletion unit 6 included in the plug-in automatic reconfiguration unit according to Embodiment 8 have the following features:

the plug-in management unit 3 manages each plug-in module's information of download fee, and the plug-in deletion unit 6 gives a deletion priority from high to low in order starting from the plug-in module whose download fee is the lowest, based on information of each plug-in module's download fee.

The communications apparatus according to Embodiment 8 is the receiving terminal 100 where a browser having the above-mentioned plug-in automatic reconfiguration unit is installed.

Namely, the plug-in management unit and the plug-in deletion unit included in the communications apparatus according to Embodiment 8 have the following features:

the plug-in management unit manages a plurality of plug-in modules and their required fees for inputting, and the plug-in deletion unit selects a plurality of plug-in modules differing from the plug-in module judged by the plug-in judgement unit, out of the plurality of plug-in modules managed by the plug-in management unit, and deletes a plug-in module in order of deletion priority starting from the module whose required fee is the lowest, out of the selected plurality of plug-in modules.

Embodiment 9

Figure 4:
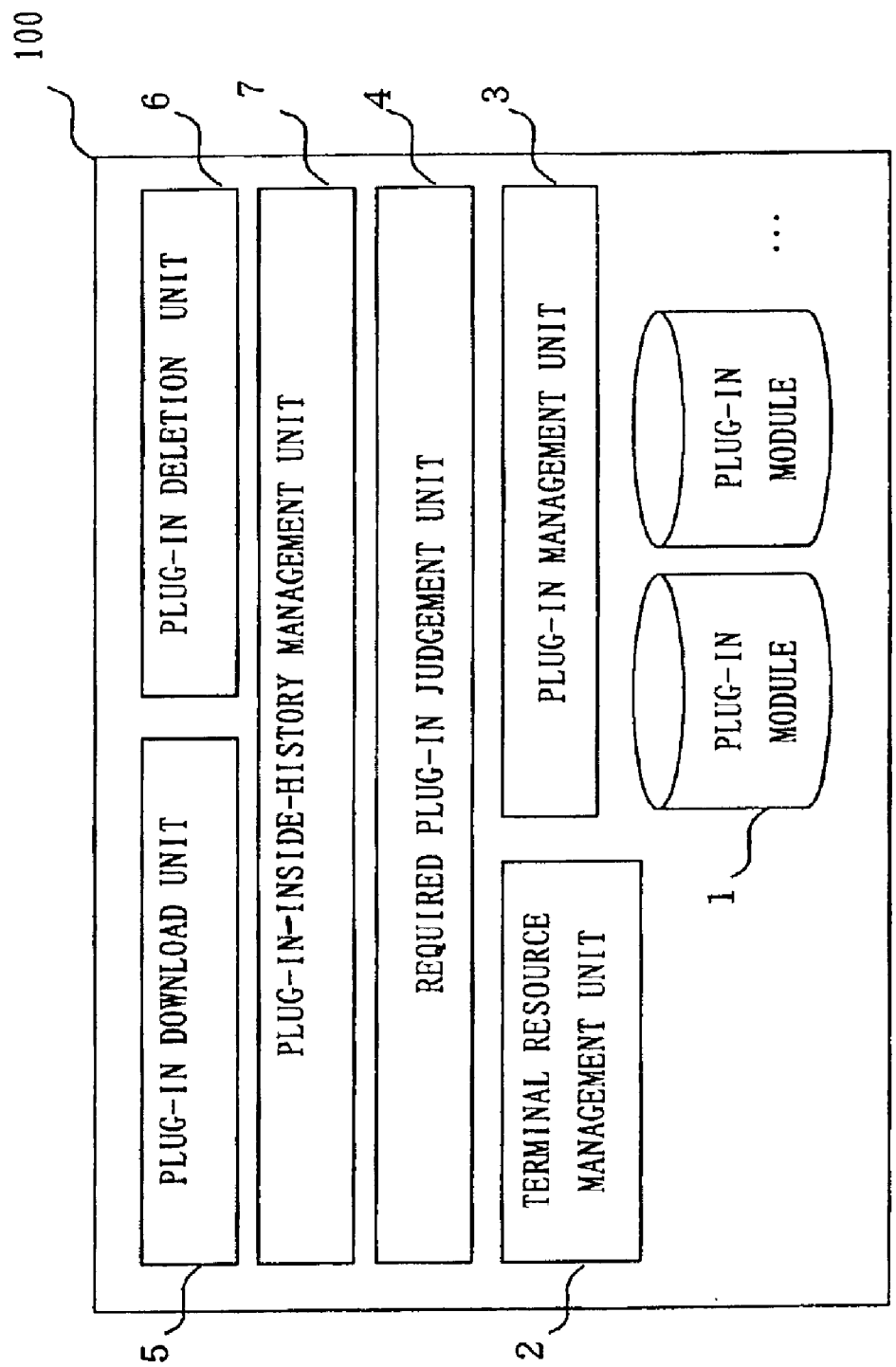
FIG. 4 is a block diagram showing an example of a configuration of a plug-in automatic reconfiguration unit according to Embodiment 9.

FIG. 4 is a block diagram showing a configuration example of the plug-in automatic reconfiguration unit according to Embodiment 9. In FIG. 4, a plug-in-inside-history management unit 7 is provided. The plug-in-inside-history management unit 7 manages a contents display history formed by user's selecting a link or a submit button in the contents in order to display the next contents, and can specify a plug-in module used by each contents in the history. Other configurations are the same as those described in FIG. 1 through FIG. 3.

Figure 5:
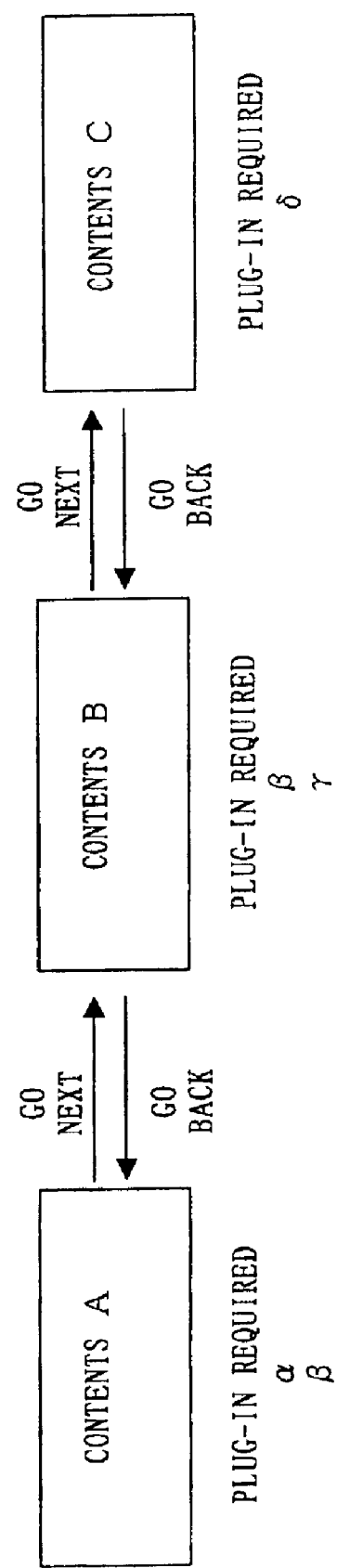
FIG. 5 shows an example of the contents display history and plug-in modules used in it.

FIG. 5 shows an example of the contents display history and plug-in modules used in it. In this example, three contents exist in the history. Contents B is received by selecting a link or a submit button in contents A, and contents C is received by selecting a link or a submit button in contents B. It is supposed that plug-in modules $\alpha$ and $\beta$ are necessary for displaying contents A, plug-in modules $\beta$ and $\gamma$ are necessary for displaying contents B, and a plug-in $\delta$ is required for displaying contents C.

An operation example of the plug-in automatic reconfiguration unit according to Embodiment 9 will now be explained referring to FIG. 4 and FIG. 5. When a browser receives the contents A, the required plug-in judgement unit 4 judges that the plug-in modules $\alpha$ and $\beta$ are required, based on the operation described in Embodiment 1. Furthermore, when the required plug-in judgement unit 4 judges that the plug-in modules $\alpha$ and $\beta$ are required, the required plug-in judgement unit 4 notifies this to the plug-in-inside-history management unit 7. The plug-in-inside-history management unit 7 stores that the plug-in modules $\alpha$ and $\beta$ are required in the present contents history display. Moreover, if the plug-in download unit 5 and the plug-in deletion unit 6 are required, download/deletion will be performed. In the case of the plug-in deletion unit 6 selecting a candidate to be deleted, after referring to the plug-in-inside-history management unit 7, the plug-in deletion unit 6 excludes the plug-in modules $\alpha$ and $\beta$ which are needed in the present contents history display, from the deletion candidates to be deleted. Next, receiving the contents B by selecting a link or a submit button existing in the contents A, the required plug-in judgement unit 4 judges that the plug-in modules $\beta$ and $\gamma$ are required, and the required plug-in judgement unit 4 notifies this to the plug-in-inside-history management unit 7. The plug-in-inside-history management unit 7 adds a plug-in module $\gamma$ newly required to the group of stored $\alpha$ and $\beta$, as a required plug-in module in the present contents history. Moreover, if the plug-in download unit 5 and the plug-in deletion unit 6 are required, download/deletion will be performed. In the case of the plug-in deletion unit 6 selecting a candidate to be deleted, after referring to the plug-in-inside-history management unit 7, the plug-in deletion unit 6 excludes the plug-in modules $\alpha$, $\beta$, and $\gamma$ which are needed in the present contents history display, from the deletion candidates to be deleted. In receiving the contents C, the same operation will be performed.

By dint of the operation above stated, the plug-in automatic reconfiguration unit, where the plug-in module used in the present contents history is not deleted if possible, can be provided. Since the contents in the contents history may be frequently accessed by the operation of user's "go" and "go back", times of re-downloading plug-in modules can be reduced by not deleting the plug-in modules needed in the operation of the user's "going" and "going back".

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

In addition to the terminal resource management unit, the plug-in management unit, the required plug-in judgement unit, the plug-in download unit, and the plug-in deletion unit described in Embodiment 1, the plug-in automatic reconfiguration unit provided in a browser according to Embodiment 9 includes the plug-in-inside-history management unit 7 and has the following features:

the plug-in-inside-history management unit 7 manages the contents display history formed by user's selecting a link or a submit button in the contents in order to display the next contents, and can specify a plug-in module used by each contents in the history, and the plug-in deletion unit 6 heightens deletion priority of plug-in modules not used in the contents display history.

The communications apparatus according to Embodiment 9 is the receiving terminal 100 where a browser having the above-mentioned plug-in automatic reconfiguration unit is installed.

Namely, the communications apparatus according to Embodiment 9 further includes the plug-in-inside-history management unit which manages display histories of a plurality of contents, inputs plug-in modules judged by the plug-in judgement unit, a plurality of times, and specifies a plug-in module required for each contents of the plurality of contents corresponding to the managed display histories, based on the input plug-in modules, and the plug-in management unit and the plug-in deletion unit included in the communications apparatus according to Embodiment 9 have the following features:

the plug-in management unit manages a plurality of plug-in modules, and the plug-in deletion unit deletes at least one plug-in module except at least one plug-in module required for each contents of the plurality of contents corresponding to the display histories managed by the plug-in-inside-history management unit, out of the plurality of plug-in modules managed by the plug-in management unit.

Embodiment 10

Figure 6:
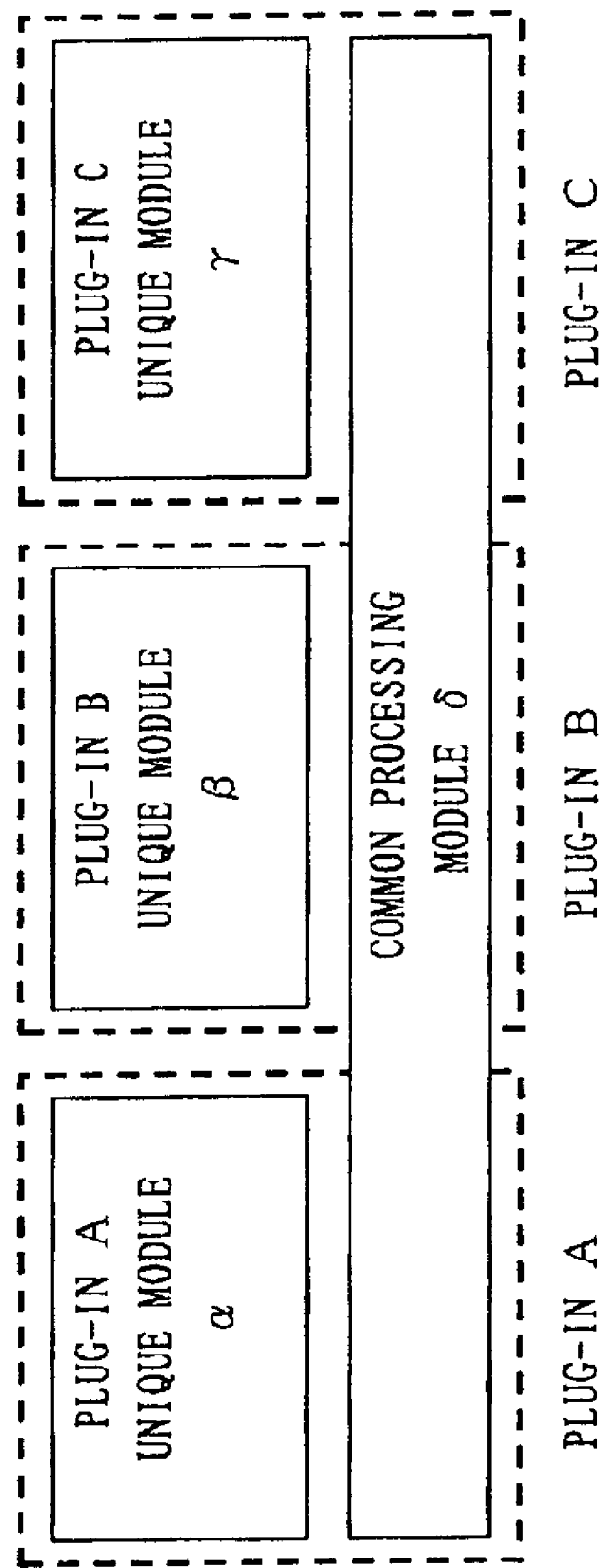
FIG. 6 illustrates a state where a plurality of plug-in modules are installed with being divided into two parts, one of which includes modules for respectively performing unique processing, and the other of which includes modules for performing common processing, in order to increase the efficiency of common processing part installation.

An install method as shown in FIG. 6 can be considered depending on a plug-in module. FIG. 6 illustrates the state where a plurality of plug-in modules are installed with being divided into two parts, one of which includes modules for respectively performing unique processing, and the other of which includes modules for performing common processing, in order to increase the efficiency of common processing part installation.

In this example of FIG. 6, the plug-in module A is composed of a module α for performing processing unique to the plug-in module A and a module δ for performing common processing, a plug-in module B is composed of a module β for performing processing unique to the plug-in module B and a module δ for performing common processing, and a plug-in module C is composed of a module γ for performing processing unique to the plug-in module C and a module δ for performing common processing.

An operation example of the plug-in automatic reconfiguration unit according to Embodiment 10 will now be explained referring to FIG. 3 and FIG. 6.

Most of the operations are the same as those described in the Embodiment 1. In Embodiment 10, the plug-in management unit 3 manages relation of a common processing module part and a unique processing module part of each plug-in module. When the plug-in deletion unit 6 makes the plug-in modules A, B, and C be deletion candidates, the plug-in deletion unit 6 determines deletion priorities of the plug-in modules A, B, and C based on a certain rule (for example, the deletion priority standard explained in Embodiments from 2 to 8). Next, the plug-in deletion unit 6 checks the plug-in management unit 3 to know the module composition of each plug-in module, and determines deletion priorities of plug-in composition modules based on deletion priorities of plug-in modules. Suppose, for example, that deletion priority of plug-in modules is from high to low in order of A, B, and C. Deletion priorities of plug-in composition modules are decided to be from high to low in order of the unique processing module α of the plug-in module A, the unique processing module β of the plug-in module B, the unique processing module γ of the plug-in module C and the common processing module δ of the plug-in modules A, B, and C. Deletion is executed for each of the unnecessary plug-in composition modules α, β, γ, δ one by one, based on the determined deletion priorities, and stops the deletion at the time of an empty resource for H/W (Hard ware) to be newly downloaded having been secured. By dint of the above operation, the times of deleting the common processing module δ is reduced. Then, if it becomes necessary to re-download the plug-in modules A, B, and C, it is enough to download only the unique processing modules of the plug-in modules A, B, and C. Accordingly, the load of re-downloading plug-in modules can be reduced.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

As mentioned above, when a plurality of plug-in modules of a browser are installed with being a combination of two parts, one of which is a common processing module common to other plug-in modules and the other of which is a unique processing module unique to each of the plurality of plug-in modules, the plug-in automatic reconfiguration unit provided in a browser according to Embodiment 10 has the following features:

the plug-in management unit 3 manages relation of a common processing module part and a unique processing module part, of each plug-in module, and the plug-in deletion unit 6 gives deletion priority only to unique processing modules, and does not delete a common processing module until all the unique processing modules related to the common processing module have been deleted.

The communications apparatus according to Embodiment 10 is the receiving terminal 100 where a browser having the above-mentioned plug-in automatic reconfiguration unit is installed.

Namely, the communications apparatus according to Embodiment 10 further includes the plug-in-inside-history management unit which manages display histories of a plurality of contents, inputs plug-in modules judged by the plug-in judgement unit, a plurality of times, and specifies a plug-in module required for each contents of the plurality of contents corresponding to the managed display histories, based on the input plug-in modules, and the plug-in management unit and the plug-in deletion unit included in the communications apparatus according to Embodiment 10 have the following features:

the plug-in management unit manages a plurality of plug-in modules, and the plug-in deletion unit selects a plurality of plug-in modules differing from the current plug-in module judged by the plug-in judgement unit, out of the plurality of plug-in modules managed by the plug-in management unit. Then, out of the selected plurality of plug-in modules, when there are a common plug-in module required in common by a plurality of contents corresponding to a display history managed by the plug-in-inside-history management unit and unique plug-in modules required only for each of the plurality of contents corresponding to the display history managed by the plug-in-inside-history management unit, the plug-in deletion unit deletes the unique plug-in modules required only for each of the plurality of contents corresponding to the display history managed by the plug-in-inside-history management unit, with giving them deletion priorities.

Embodiment 11

Figure 7:
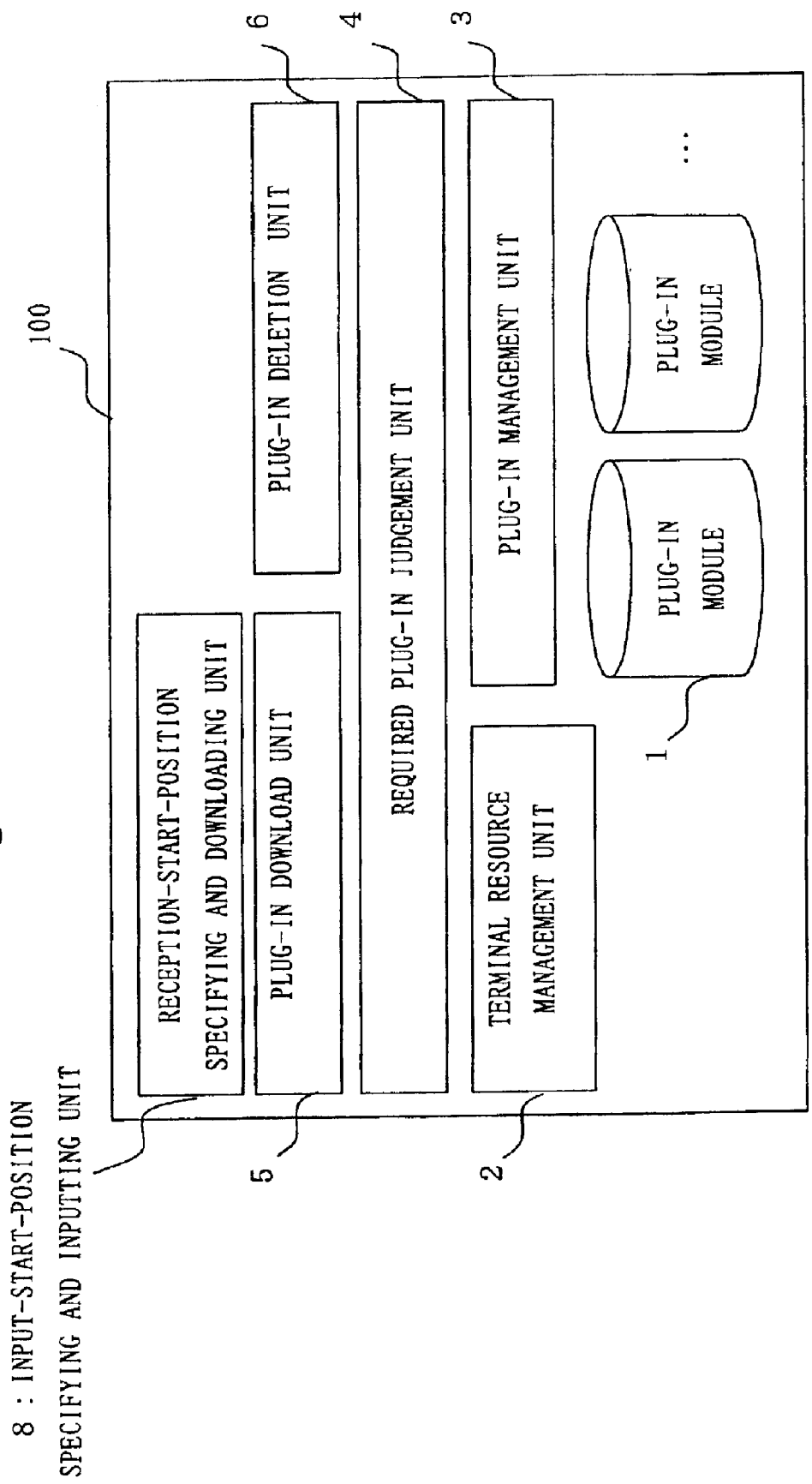
FIG. 7 is a block diagram showing an example of a configuration of a plug-in automatic reconfiguration unit according to Embodiment 11.

FIG. 7 is a block diagram showing a configuration example of the plug-in automatic reconfiguration unit according to Embodiment 11. In FIG. 7, it is shown a reception-start-position specifying and downloading unit 8 (an example of an input-start-position specifying and inputting unit) which can specify a reception start position for downloading a reception file.

Other configurations are the same as those described in FIG. 1 through FIG. 3.

Figure 8:
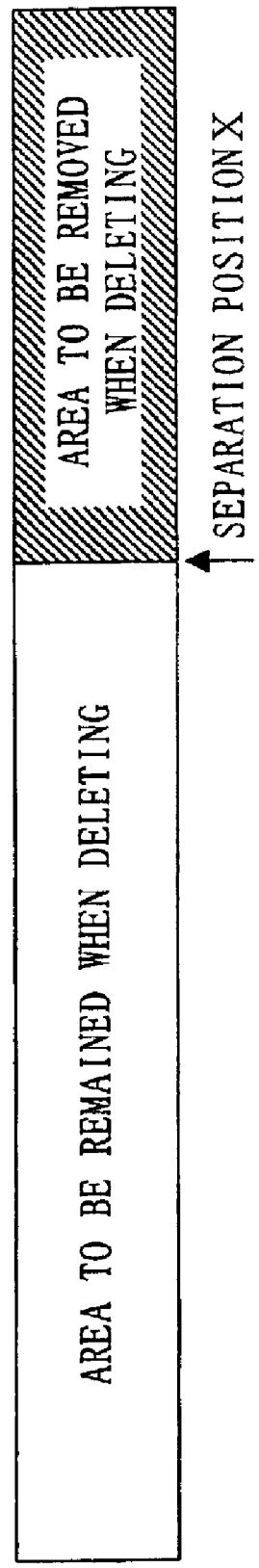
FIG. 8 illustrates an example of separating and deleting a plug-in module file according to Embodiment 11.

FIG. 8 illustrates an example of separating and deleting a plug-in module file according to Embodiment 11. In the separation and the deletion of FIG. 8, the file data is divided into data before arbitrary position X and data after arbitrary position X. The remaining data after deleting data after X is saved as a file.

An operation example of the plug-in automatic reconfiguration unit according to Embodiment 11 will now be explained referring to FIG. 7 and FIG. 8. Most of the operations are the same as those described in the Embodiment 1. In Embodiment 11, when the plug-in deletion unit 6 executes deletion, whole module file deletion (whole deletion) or separated module file deletion (separation deletion) is properly performed depending upon a situation. Suppose, for example, that an area of 100 KB (kilo byte) size is lacking for downloading a new plug-in module, plug-in modules A and B are candidates for deletion, a deletion priority of the plug-in module A is higher than that of the plug-in module B, and the module size of A is 80 KB and that of B is 60 KB. In this case, the plug-in deletion unit 6 firstly deletes the plug-in module A. If it is impossible to compensate the lacking area by deleting the whole module file, whole deletion is executed. Therefore, the whole file of the plug-in module A is deleted. (The lacking area: 100 KB>the module A: 80 KB). Namely, after the whole deletion of the plug-in module A is executed, the lacking area size becomes 20 KB=100−80. Next, the plug-in deletion unit 6 is going to delete the plug-in module B. If it is possible to compensate the lacking area by deleting a separated module file, separation deletion is executed. Namely, the separation deletion is carried out by way of deleting the data of lacking area size. Therefore, separating and deleting is to be performed for the file of the plug-in module B. (The lacking area: 20 KB<the module B: 60 KB) File data of 40 KB= (60−20) of the module B still remains.

When the plug-in deletion unit 6 executes separation deletion, the plug-in management unit 3 manages a remaining file after separating and deleting the plug-in module file, and a separation position (an example of a division position). Furthermore, when the plug-in download unit 5 downloads the plug-in module B again, the separation position X (the position of 40 KB, in this case) of the module file is checked and acquired from the plug-in management unit 3 in the first place. Then, the file data after the separation position X (the data of 20 KB, in this case) is downloaded by using the reception-start-position specifying and downloading unit 8. The downloaded data, that is the file data after the separation position X, is combined with the remaining file data to complete the file of the plug-in module B.

By dint of the above operation, the re-download can be attained by downloading data of 20 KB which is smaller than 60 KB indicating the whole deletion of the plug-in module B. Accordingly, the load of re-downloading the plug-in module can be reduced.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

As mentioned above, the plug-in automatic reconfiguration unit included in the browser according to Embodiment 11 further includes the reception-start-position specifying and downloading unit 8 and has the following features in addition to the browser described in Embodiment 1.

The reception-start-position specifying and downloading unit 8 can specify a reception start position for downloading a reception file.

The plug-in deletion unit 6 can perform separation deletion for the module file of the plug-in module being a deletion candidate. Namely, the module file of the plug-in module being the deletion candidate is separated at an arbitrary file position X, and only the file data after the position X is deleted.

The plug-in management unit 3 manages the position of the separation deletion when separation deletion has been performed for a module file of each plug-in module.

When re-download is to be performed for the plug-in module whose file data after the position X has been separated and deleted, only the data after the position X is downloaded and combined with the remaining file data to complete the plug-in module file.

The communications apparatus according to Embodiment 11 is the receiving terminal 100 where a browser having the above-mentioned plug-in automatic reconfiguration unit is installed.

Namely, the plug-in deletion unit and the plug-in management unit included in the communications apparatus according to Embodiment 11 have the following features:

When a lacking amount (capacity) for newly storing a plug-in module judged by the plug-in judgement unit into the memory storage can be compensated by deleting a part of amount of a specific plug-in module stored in the memory storage, the plug-in deletion unit divides the specific plug-in module file into two and deletes one of the divided file data of the specific plug-in module. Then, the plug-in management unit manages a division position where the specific plug-in module has been divided by the plug-in deletion unit.

The communications apparatus further includes the input-start-position specifying and inputting unit which inputs the deleted plug-in module file of the specific plug-in module, deleted by the plug-in deletion unit, based on the division position managed by the plug-in management unit.

Embodiment 12

Figure 9:
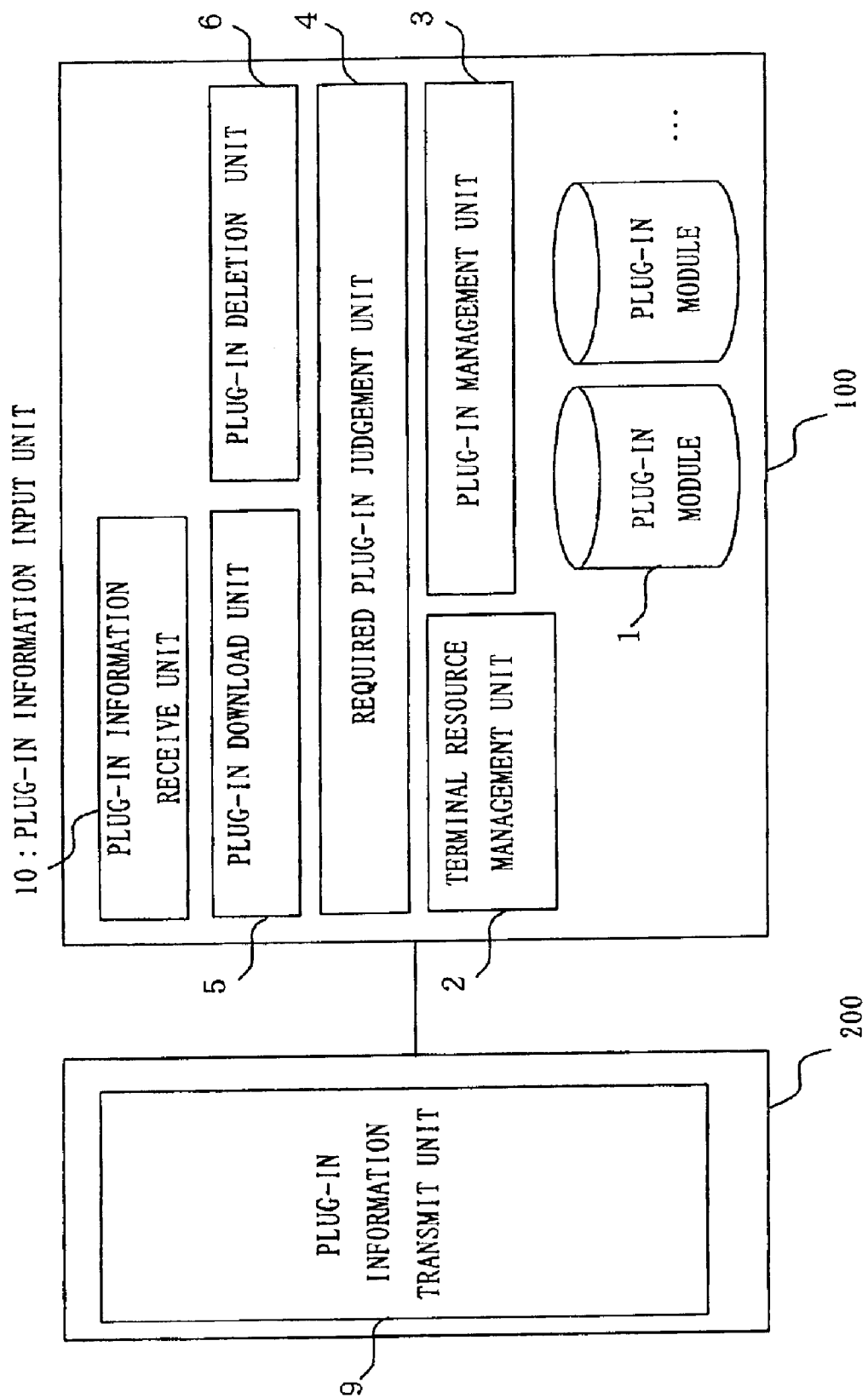
FIG. 9 is a block diagram showing an example of a configuration of a plug-in automatic reconfiguration unit according to Embodiment 12.

FIG. 9 is a block diagram showing a configuration example of the plug-in automatic reconfiguration unit according to Embodiment 12. A plug-in information transmit unit 9 by which information on a plug-in module group to be used in a certain web system and a use frequency (an example of plug-in information) can be transmitted in advance to a receiving terminal, and a plug-in information receive unit 10 (an example of a plug-in information input unit) by which the transmitted plug-in information can be received at the receiving terminal side are shown in FIG. 9. A transmitting terminal 200 as well as the receiving terminal 100 includes each configuration element as shown in FIGS. 1 and 2.

Other configurations are the same as those described in FIG. 1 through FIG. 3.

An operation example of the plug-in automatic reconfiguration unit according to Embodiment 12 will now be explained referring to the block diagram of FIG. 9.

Suppose, for example, that a web system which performs picture distribution exists, contents for displaying a practical picture can be received in this web system by following a link from the contents A which displays the first menu screen, and the picture display is performed by plug-in modules α, β, and γ in this web system. If the operation for utilizing this picture distribution web system S is performed at the receiving terminal 100 side, the first menu screen contents A is distributed. Then, the transmitting terminal 200 being a distribution side notifies the reception side that the frequency of using the plug-in modules α, β, and γ after the contents A is high, by using the plug-in information transmit unit 9. At the reception side, the contents A is received, and the information transmitted by the plug-in information transmit unit 9 is received at the plug-in information receive unit 10. The received information is transmitted to the plug-in deletion unit 6 beforehand. Most of the operations for the plug-in reconfiguration performed with receiving the contents A are the same as those described in Embodiment 1. In Embodiment 12, however, when the plug-in deletion unit 6 executes deletion, deletion priorities of the plug-in modules α, β, and γ, for which it was notified by the plug-in information receive unit 10 that their use frequencies are high, are set to be low. By dint of the above operation, the plug-in modules α, β, and γ whose use frequencies in netsurfing after displaying the contents A are high, are not deleted as much as possible. Accordingly, the load of re-downloading a plug-in module can be reduced.

The receiving terminal 100 is not limited to the personal computer (PC). For example, built-in equipment, such as a cellular phone, a car-navigation system, and a PDA, can be the receiving terminal 100. Server equipment such as a web server utilizing the means of the plug-in information transmit unit 9 can be the transmitting terminal 200. Moreover, a web system composed of these built-in equipment and server equipment can be the system. Furthermore, it is acceptable to use a computer program utilized for a browser, as each unit mentioned above.

As mentioned above, the plug-in automatic reconfiguration unit included in the browser according to Embodiment 12 further includes the plug-in information transmit unit 9 and the plug-in information receive unit 10, and has the following features in addition to the browser described in Embodiment 1.

The plug-in information transmit unit 9 can transmit information on a plug-in module group to be used in a certain web system and use frequency to the receiving terminal in advance. The plug-in information receive unit 10 can receive the transmitted plug-in information at the receiving terminal side.

The plug-in deletion unit 6 judges plug-in modules to be used from now on and their use frequencies, based on the received plug-in information, and gives deletion priorities to plug-in modules being deletion candidates.

Moreover, the communications apparatus according to Embodiment 12 is the receiving apparatus including a browser having the plug-in automatic reconfiguration unit and the transmitting apparatus including the plug-in information transmit unit. The system is composed of these receiving apparatus and transmitting apparatus.

Namely, the communications apparatus according to Embodiment 12 further includes the plug-in information input unit for inputting plug-in information to be used, and the plug-in management unit and the plug-in deletion unit included in the communications apparatus according to Embodiment 12 have the following features:

the plug-in management unit manages a plurality of plug-in modules, and the plug-in deletion unit selects a plurality of plug-in modules differing from the plug-in module judged by the plug-in judgement unit, out of the plurality of plug-in modules managed by the plug-in management unit, and decides a plug-in module to be deleted, based on the plug-in information input by the plug-in information input unit, out of the selected plurality of plug-in modules.

Embodiment 13

Figure 10:
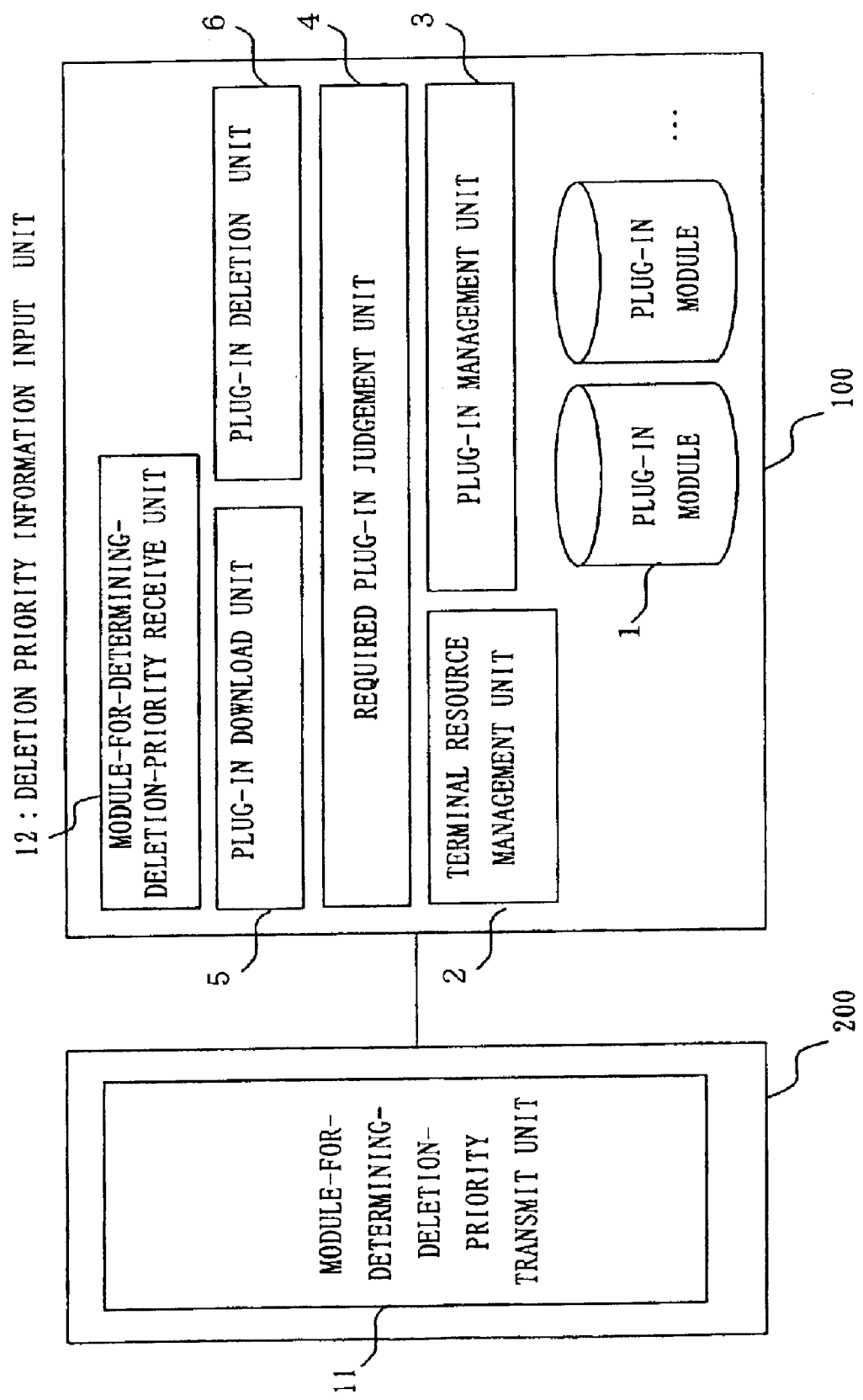
FIG. 10 is a block diagram showing an example of a configuration of a plug-in automatic reconfiguration unit according to Embodiment 13.

FIG. 10 is a block diagram showing a configuration example of the plug-in automatic reconfiguration unit according to Embodiment 13. A module-for-determining-deletion-priority transmit unit 11 which can transmit a processing module (an example of plug-in-deletion-priority-information) for determining a deletion priority of a plug-in module to the receiving terminal 100, and a module-for-determining-deletion-priority receive unit 12 (an example of a deletion priority information input unit) which can receive the transmitted module for determining deletion priority at the receiving terminal 100 side are shown in FIG. 10.

Other configurations are the same as those described in FIG. 1 through FIG. 3 and FIG. 9.

An operation example of the plug-in automatic reconfiguration unit according to Embodiment 13 will now be explained referring to FIG. 10.

In Embodiments 2 through 12, ways of determining the deletion priority of each plug-in module have been described. In these ways, however, the deletion priority is determined at the receiving terminal 100 side based on a specific rule and its logic. Namely, it is impossible to customize determination logic at the transmission side depending upon the case. Then, in Embodiment 13, the transmission side distributes a certain contents and transmits a module for determining deletion priority to the reception side, by using the module-for-determining-deletion-priority transmit unit 11. The reception side receives the contents, and the module for determining deletion priority transmitted by the module-for-determining-deletion-priority transmit unit 11, at the module-for-determining-deletion-priority receive unit 12. The received module for determining deletion priority is registered into the plug-in deletion unit 6 beforehand. Most of the operations for the plug-in reconfiguration performed with receiving the contents are the same as those described in Embodiment 1. In Embodiment 13, however, when the plug-in deletion unit 6 executes deletion, a deletion priority of a plug-in module can be determined by calling the registered module for determining deletion priority. By dint of the above operation, it is possible for the transmission side to customize deletion priority determination logic by using the module for determining deletion priority. Accordingly, the plug-in automatic reconfiguration unit highly customizable can be provided.

The receiving terminal 100 is not limited to the personal computer (PC). For example, built-in equipment, such as a cellular phone, a car-navigation system, and a PDA, can be the receiving terminal 100. Server equipment such as a web server utilizing the means of the module-for-determining-deletion-priority transmit unit 11 can be the transmitting terminal 200. Moreover, a web system composed of these built-in equipment and server equipment can be the system. Furthermore, it is acceptable to use a computer program utilized for a browser, as each unit mentioned above.

As mentioned above, the plug-in automatic reconfiguration unit included in the browser according to Embodiment 13 further includes the module-for-determining-deletion-priority transmit unit 11, and the module-for-determining-deletion-priority receive unit 12, and has the following features in addition to the browser described in Embodiment 1.

The module-for-determining-deletion-priority transmit unit 11 can transmit a processing module for determining a deletion priority of a plug-in module to the receiving terminal.

The module-for-determining-deletion-priority receive unit 12 can receive the transmitted module for determining a deletion priority at the receiving terminal 100 side.

The plug-in deletion unit 6 starts the received module for determining a deletion priority and performs determining a priority of a deletion candidate.

The communications apparatus according to Embodiment 13 is the receiving apparatus including a browser having the plug-in automatic reconfiguration unit and the transmitting apparatus including the plug-in information transmit unit. The system is composed of these receiving apparatus and transmitting apparatus.

Namely, the communications apparatus according to Embodiment 13 further includes the deletion priority information input unit for inputting plug-in-deletion-priority-information including priority information for deleting a plug-in module, and the plug-in management unit the plug-in deletion unit included in the communications apparatus according to Embodiment 13 have the following features:

the plug-in management unit manages a plurality of plug-in modules, and the plug-in deletion unit selects a plurality of plug-in modules differing from the plug-in module judged by the plug-in judgement unit, out of the plurality of plug-in modules managed by the plug-in management unit, and decides a plug-in module to be deleted based on the plug-in-deletion-priority-information input by the deletion priority information input unit, out of the selected plurality of plug-in modules.

Embodiment 14

Figure 11:
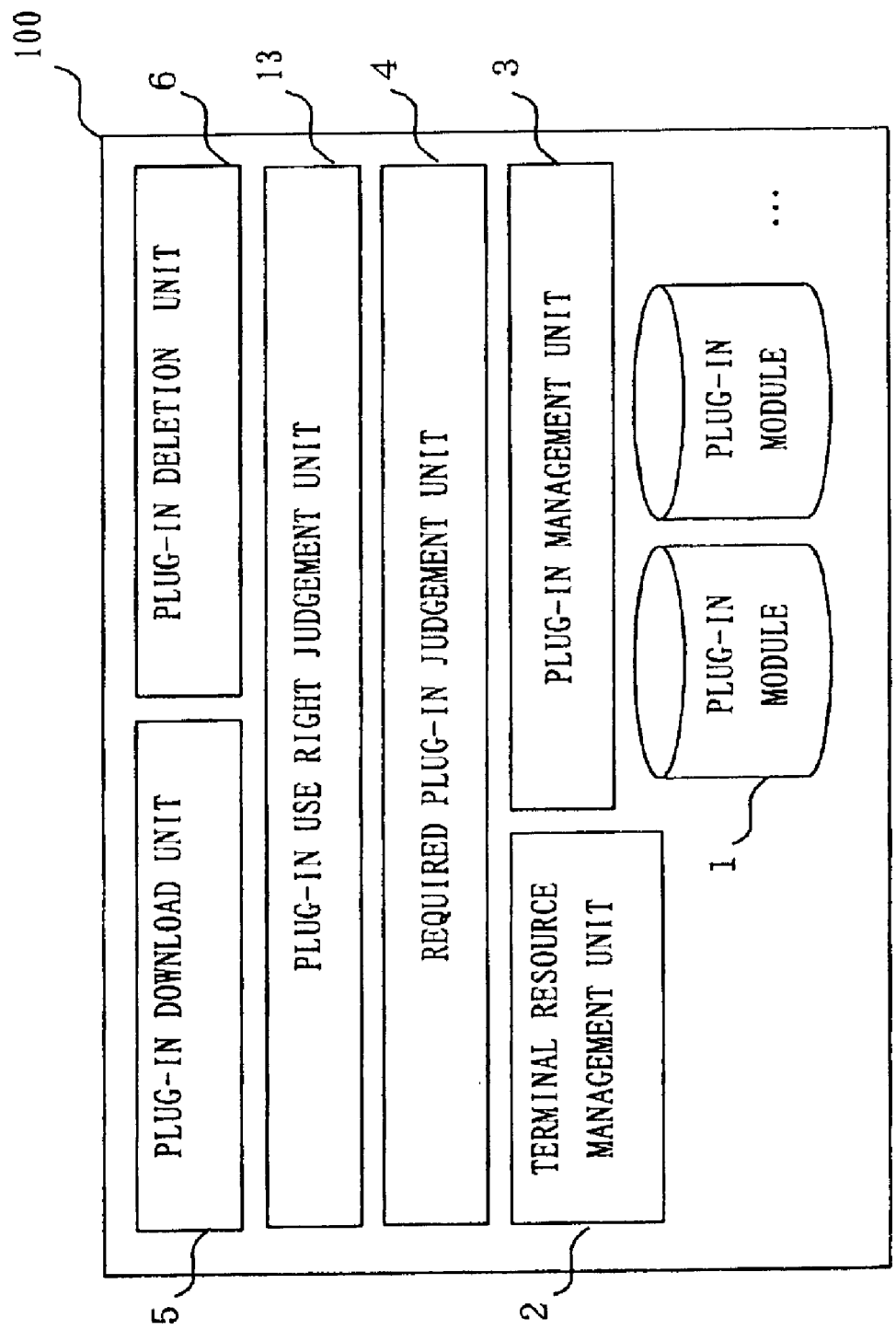
FIG. 11 is a block diagram showing an example of a configuration of a plug-in automatic reconfiguration unit according to Embodiment 14.

FIG. 11 is a block diagram showing a configuration example of the plug-in automatic reconfiguration unit according to Embodiment 14. In FIG. 11, it is shown a plug-in use right judgement unit 13 which judges whether a use right is satisfied or not at the time of using a plug-in module.

Other configurations are the same as those described in FIG. 1 through FIG. 3.

An operation example of the plug-in automatic reconfiguration unit according to Embodiment 14 will now be explained referring to the block diagram of FIG. 11.

The case can be considered that a use right is stipulated depending on a plug-in module and only while the use right is satisfied, it is allowed to use the plug-in module. In order to deal with such a case, when the plug-in download unit 5 downloads a plug-in module, if use right conditions exists for the plug-in module, the plug-in download unit 5 downloads information on the use right conditions (an example of use right information) in Embodiment 14. The downloaded plug-in module and the downloaded information on the use right are correspondingly managed by the plug-in management unit 3. When a browser calls the plug-in module, it is judged whether the use right is satisfied or not by the plug-in use right judgement unit 13. When the use right is satisfied, the plug-in is executed. If conditions change because of the execution, changed conditions (an example of changed use right information) are registered anew in the plug-in management unit 3. When the use right is not satisfied, the plug-in deletion unit 6 receives a notification to delete the plug-in module. By dint of the above operation, it is possible to each time delete an unexecutable plug-in module whose use right is not satisfied. Therefore, the plug-in automatic reconfiguration unit where a restricted H/W resource is utilized to the maximum can be provided.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

As mentioned above, the plug-in automatic reconfiguration unit included in the browser according to Embodiment 14 further includes the plug-in use right judgement unit 13 when the plug-in module has conditions regarding a stipulated use right, and the plug-in automatic reconfiguration unit included in the browser according to Embodiment 14 has the following features, in addition to the browser described in Embodiment 1.

The plug-in use right judgement unit 13 judges whether a use right is satisfied or not at the time of using a plug-in module.

The plug-in management unit 3 manages information on a use right of a plug-in module.

The plug-in download unit 5 downloads information on a use right of a plug-in module.

The plug-in deletion unit 6 deletes a plug-in module automatically at the time when the use right of the plug-in module is no longer satisfied.

Furthermore, the communications apparatus according to Embodiment 14 is the receiving apparatus where a browser having the above-mentioned plug-in automatic reconfiguration unit is installed.

Namely, the plug-in management unit included in the communications apparatus according to Embodiment 14 manages a plurality of plug-in modules and use right information of each of the plurality of plug-in modules, the communications apparatus further includes the plug-in use right judgement unit which judges whether a use right exists for each of the plurality of plug-in modules managed by the plug-in management unit, based on the use right information managed by the plug-in management unit, and the plug-in deletion unit deletes a plug-in module which is judged that no use right exists by the plug-in right judgement unit, out of the plurality of plug-in modules managed by the plug-in management unit.

Moreover, the plug-in use right judgement unit outputs changed use right information if the use right information managed by the plug-in management unit changes, and the plug-in management unit registers the changed use right information output by the plug-in use right judgement unit.

Embodiment 15

As a use right of a plug-in module, the times of a plug-in module having been used can be regarded. In Embodiment 15, the plug-in module deletion accompanying the use right is performed based on the following embodiment.

Each configuration is the same as that described in Embodiment 14.

While downloading a plug-in module, the plug-in download unit 5 also downloads information on the maximum value of the usable-times of the plug-in module (the possible times of using the plug-in module), which is an example of usable-times information. The downloaded plug-in module and information on the usable-times of the plug-in module are correspondingly managed by the plug-in management unit 3 as the plug-in module and its remaining use times (the times of the plug-in module being able to be used from now on). When a browser calls a plug-in module, it is judged by the plug-in use right judgement unit 13 whether the value of the remaining use times is greater than 0 or not. If the value of the remaining use times is greater than 0, the plug-in module is executed. Then, one is subtracted from the value of the remaining use times. The subtracted remaining use times is registered in the plug-in management unit 3.

When the value of the remaining use times is equal to 0, the plug-in deletion unit 6 receives a notification to delete the plug-in module.

By dint of the above operation, it is possible to each time delete an unexecutable plug-in module whose use right regarding use times is not satisfied. Therefore, the plug-in automatic reconfiguration unit where a restricted H/W resource is utilized to the maximum can be provided.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

As mentioned above, the plug-in use right judgement unit 13 included in the plug-in automatic reconfiguration unit according to Embodiment 15 has the following features:

the plug-in use right judgement unit 13 judges the use right based on the times of the plug-in module having been used, and when the use times exceeds a specific value (times), the plug-in use right judgement unit 13 judges that it is impossible to use the plug-in module.

Furthermore, the communications apparatus according to Embodiment 15 is the receiving terminal 100 where a browser having the above-mentioned plug-in automatic reconfiguration unit is installed.

Namely, the communications apparatus according to Embodiment 15 has the following features:

the use right information includes usable-times information of the corresponding plug-in module, the plug-in use right judgement unit judges whether a value of usable-times of each of the plurality of plug-in modules managed by the plug-in management unit is greater than 0 (zero) or not, and the plug-in deletion unit deletes a plug-in module whose value of usable-times has been judged to be equal to 0 by the plug-in use right judgement unit, out of the plurality of plug-in modules managed by the plug-in management unit.

Embodiment 16

As a use right of a plug-in module, a total time-period of a plug-in module having processed can be regarded. In Embodiment 16, the plug-in module deletion accompanying the use right is performed based on the following embodiment.

Each configuration is the same as that described in Embodiment 14.

While downloading a plug-in module, the plug-in download unit 5 also downloads information on the maximum value of usable-total-processing-period of the plug-in module (the total processing time-period in which the plug-in module can be used), which is an example of usable-time-period information. The downloaded plug-in module and information on the usable-total-processing-period of the plug-in module are correspondingly managed by the plug-in management unit 3 as the plug-in module and its remaining processing time-period (the time-period of the plug-in module being able to be processed from now on). When a browser calls a plug-in module, it is judged by the plug-in use right judgement unit 13 whether the value of the remaining processing time-period is greater than 0 or not. If the value of the remaining processing time-period is greater than 0, the plug-in module is executed. Further, the plug-in use right judgement unit 13 monitors whether the remaining processing time-period has elapsed during executing the plug-in module or not. If the remaining processing time-period has elapsed, the plug-in deletion unit 6 receives a notification to delete the plug-in module. If the execution of the plug-in module finishes before the remaining processing time-period has elapsed, the actual execution time-period is subtracted from the value of the remaining processing time-period. Then, the subtracted remaining processing time-period is registered in the plug-in management unit 3. When the value of the remaining processing time-period is equal to 0), the plug-in deletion unit 6 receives a notification to delete the plug-in module.

By dint of the above operation, it is possible to each time delete an unexecutable plug-in module whose use right regarding total processing time-period is not satisfied. Therefore, the plug-in automatic reconfiguration unit where a restricted H/W resource is utilized to the maximum can be provided.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

As mentioned above, the plug-in use right judgement unit 13 included in the plug-in automatic reconfiguration unit according to Embodiment 16 has the following features:

the plug-in use right judgement unit 13 judges the use right based on the total time-period of the plug-in module having processed, and when the total processing time-period exceeds a specific value (time-period), the plug-in use right judgement unit 13 judges that it is impossible to use the plug-in module.

Furthermore, the communications apparatus according to Embodiment 16 is the receiving terminal 100 where a browser having the above-mentioned plug-in automatic reconfiguration unit is installed.

Namely, the communications apparatus according to Embodiment 16 has the following features:

the use right information includes usable-time-period information of the corresponding plug-in module, the plug-in use right judgement unit judges whether a value of usable-time-period of each of the plurality of plug-in modules managed by the plug-in management unit is greater than 0 (zero) or not, and the plug-in deletion unit deletes a plug-in module whose value of usable-time-period has been judged to be equal to 0 by the plug-in use right judgement unit, out of the plurality of plug-in modules managed by the plug-in management unit.

Embodiment 17

As a use right of a plug-in module, a total data size of a plug-in module having processed can be regarded. In Embodiment 17, the plug-in module deletion accompanying the use right is performed based on the following embodiment.

Each configuration is the same as that described in Embodiment 14.

While downloading a plug-in module, the plug-in download unit 5 also downloads information on the maximum value of usable-total-data-size of the plug-in module (an example of possible-data-processing-size information). The downloaded plug-in module and information on the usable-total-data-size of the plug-in module are correspondingly managed by the plug-in management unit 3 as the plug-in module and its remaining data size (the size of data of the plug-in module being able to process from now on). When a browser calls a plug-in module, it is judged by the plug-in use right judgement unit 13 whether the value of the remaining data size is greater than 0 or not. If the value of the remaining data size is greater than 0, the plug-in module is executed. Further, the plug-in use right judgement unit 13 monitors whether the data of the remaining data size has been processed during executing the plug-in module or not. If the data of the remaining data size has been processed, the plug-in deletion unit 6 receives a notification to delete the plug-in module. If the execution of the plug-in module finishes before the data of the remaining data size has been processed, the actual processed data size is subtracted from the value of the remaining data size. Then, the subtracted remaining data size is registered in the plug-in management unit 3. When the value of the remaining data size is equal to 0, the plug-in deletion unit 6 receives a notification to delete the plug-in module.

By dint of the above operation, it is possible to each time delete an unexecutable plug-in module whose use right regarding total data size of the plug-in module having processed is not satisfied. Therefore, the plug-in automatic reconfiguration unit where a restricted H/W resource is utilized to the maximum can be provided.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

As mentioned above, the plug-in use right judgement unit 13 included in the plug-in automatic reconfiguration unit according to Embodiment 17 has the following features:

the plug-in use right judgement unit 13 judges the use right based on the total data size of the plug-in module having processed, and when the total data size exceeds a specific value (data size), the plug-in use right judgement unit 13 judges that it is impossible to use the plug-in module.

Furthermore, the communications apparatus according to Embodiment 17 is the receiving terminal 100 where a browser having the above-mentioned plug-in automatic reconfiguration unit is installed.

Namely, the communications apparatus according to Embodiment 17 has the following features:

the use right information includes possible-data-processing-size information of the corresponding plug-in module, the plug-in use right judgement unit judges whether a value of possible-data-processing-size of each of the plurality of plug-in modules managed by the plug-in management unit is greater than 0 (zero) or not, and the plug-in deletion unit deletes a plug-in module whose value of possible-data-processing-size has been judged to be equal to 0 by the plug-in use right judgement unit, out of the plurality of plug-in modules managed by the plug-in management unit.

Embodiment 18

As a use right of a plug-in module, a use-expiration-date fixed for a plug-in module can be regarded. In Embodiment 18, the plug-in module deletion accompanying the use right is performed based on the following embodiment.

Each configuration is the same as that described in Embodiment 14.

While downloading a plug-in module, the plug-in download unit 5 also downloads information on a usable-use-expiration-date of the plug-in module (an example of use-expiration-date information). The downloaded plug-in module and information on the use-expiration-date of the plug-in module are correspondingly managed by the plug-in management unit 3. When a browser calls a plug-in module, it is judged by the plug-in use right judgement unit 13 whether the use-expiration-date has expired or not. If the use-expiration-date has not passed yet, the plug-in module is executed. Further, the plug-in use right judgement unit 13 monitors whether the use-expiration-date passes during executing the plug-in module or not. If the use-expiration-date passes, the plug-in deletion unit 6 receives a notification to delete the plug-in module. If the use-expiration-date has already passed, the plug-in deletion unit 6 receives a notification to delete the plug-in module. By dint of the above operation, it is possible to each time delete an unexecutable plug-in module whose use right regarding use-expiration-date of the plug-in module is not satisfied. Therefore, the plug-in automatic reconfiguration unit where a restricted H/W resource is utilized to the maximum can be provided.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

As mentioned above, the plug-in use right judgement unit 13 included in the plug-in automatic reconfiguration unit according to Embodiment 18 has the following features:

the plug-in use right judgement unit 13 judges the use right based on the use-expiration-date fixed for the plug-in module, and when a specific date passes, the plug-in use right judgement unit 13 judges that it is impossible to use the plug-in module.

Furthermore, the communications apparatus according to Embodiment 18 is the receiving terminal 100 where a browser having the above-mentioned plug-in automatic reconfiguration unit is installed.

Namely, the communications apparatus according to Embodiment 18 has the following features:

the use right information includes use-expiration-date information of the corresponding plug-in module, the plug-in use right judgement unit judges whether a use-expiration-date of each of the plurality of plug-in modules managed by the plug-in management unit has expired or not, and the plug-in deletion unit deletes a plug-in module whose use-expiration-date is judged to have passed by the plug-in use right judgement unit, out of the plurality of plug-in modules managed by the plug-in management unit.

Embodiment 19

As a use right of a plug-in module, a lapsed time from starting using a plug-in module up to the current time can be regarded. In Embodiment 19, the plug-in module deletion accompanying the use right is performed based on the following embodiment.

Each configuration is the same as that described in Embodiment 14.

While downloading a plug-in module, the plug-in download unit 5 also downloads information on a usable-lapsed-time of the plug-in module (an example of usable-period information). The downloaded plug-in module and information on the usable-lapsed-time of the plug-in module are correspondingly managed by the plug-in management unit 3. When a browser calls a plug-in module for the first time, information on the starting time of the plug-in module processing is correspondingly stored in the plug-in management unit 3. When the browser calls the plug-in module, the plug-in use right judgement unit 13 first calculates a difference between the use starting time of the plug-in module and the current time. Then, the plug-in use right judgement unit 13 compares the calculated time difference with the usable-lapsed-time of the plug-in module in order to judge whether the usable-lapsed-time is exceeded (has passed) or not. If the usable-lapsed-time is not exceeded yet, the plug-in module is executed. Further, the plug-in use right judgement unit 13 monitors whether the usable-lapsed-time is exceeded during executing the plug-in module or not. If the usable-lapsed-time is exceeded, the plug-in deletion unit 6 receives a notification to delete the plug-in module. If the usable-lapsed-time has already passed, the plug-in deletion unit 6 receives a notification to delete the plug-in module. By dint of the above operation, it is possible to each time delete an unexecutable plug-in module whose use right regarding lapsed time from starting using the plug-in module up to the current time is not satisfied. Therefore, the plug-in automatic reconfiguration unit where a restricted H/W resource is utilized to the maximum can be provided.

The receiving terminal 100 is not limited to the personal computer (PC). For example, built-in equipment, such as a cellular phone, a car-navigation system, and a PDA, can be the receiving terminal 100. Moreover, it is also acceptable to use a computer program utilized for a browser, as each unit mentioned above.

As mentioned above, the plug-in use right judgement unit 13 included in the plug-in automatic reconfiguration unit according to Embodiment 19 has the following features:

the plug-in use right judgement unit 13 judges the use right based on the lapsed time from starting using a plug-in module up to the current time, and when a specific lapsed time is exceeded, the plug-in use right judgement unit 13 judges that it is impossible to use the plug-in module.

Furthermore, the communications apparatus according to Embodiment 19 is the receiving terminal 100 where a browser having the above-mentioned plug-in automatic reconfiguration unit is installed.

Namely, the communications apparatus according to Embodiment 19 has the following features:

the use right information includes usable-period information of the corresponding plug-in module, the plug-in use right judgement unit judges whether a usable-period of each of the plurality of plug-in modules managed by the plug-in management unit has expired or not, and the plug-in deletion unit deletes a plug-in module whose usable-period is judged to have passed by the plug-in use right judgement unit, out of the plurality of plug-in modules managed by the plug-in management unit.

Embodiment 20

Figure 12:
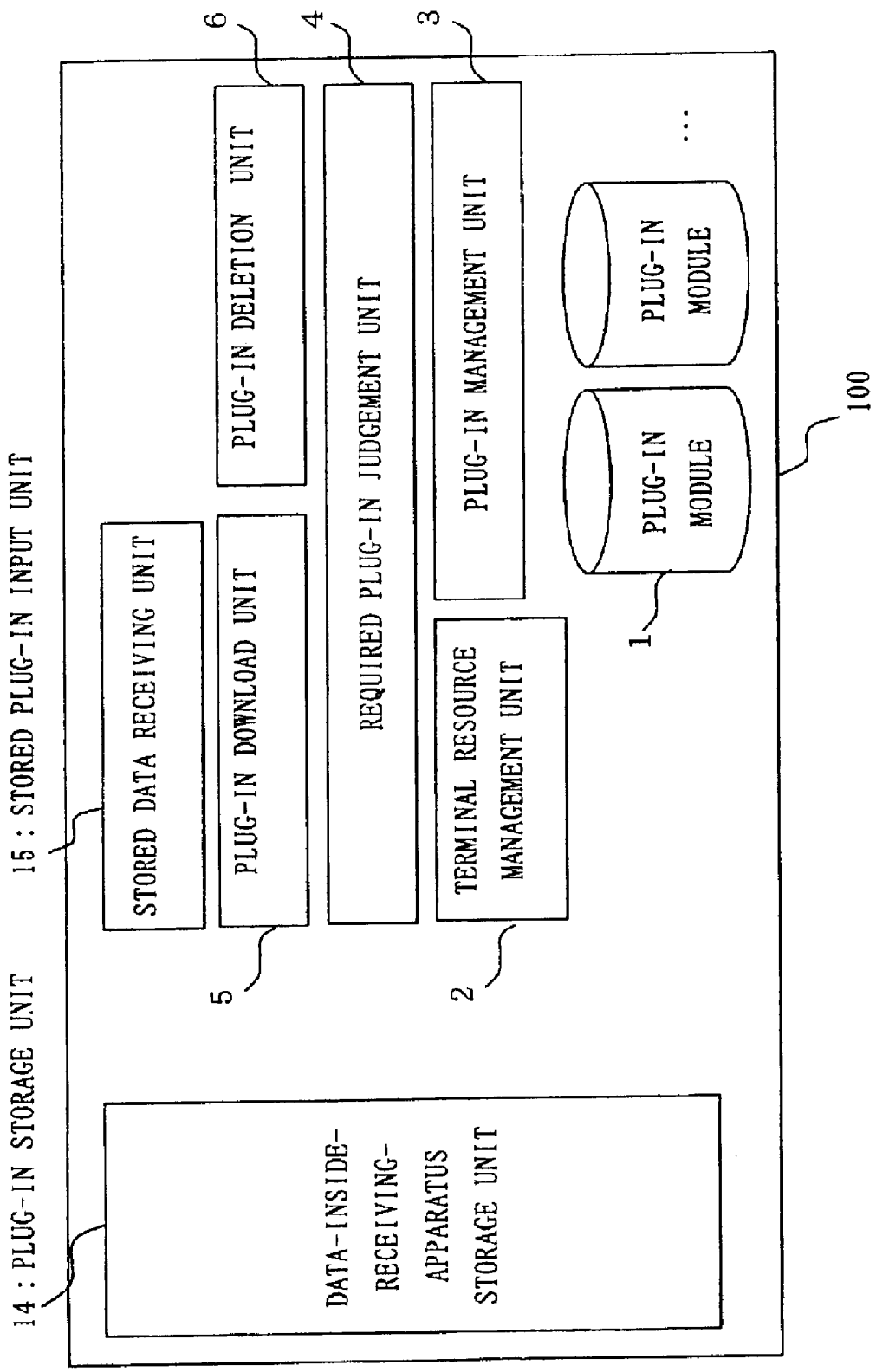
FIG. 12 is a block diagram showing an example of a configuration of a plug-in automatic reconfiguration unit according to Embodiment 20.

FIG. 12 is a block diagram showing a configuration example of the plug-in automatic reconfiguration unit according to Embodiment 20. In FIG. 12, are shown a data-inside-receiving-apparatus storage unit 14 (an example of a plug-in storage unit) by which some data in the receiving terminal can be stored in a specific storage area in a network, and a stored data receiving unit 15 (an example of a stored plug-in input unit) by which the stored data-inside-receiving-apparatus can be input into the receiving apparatus again.

Other configurations are the same as those described in FIG. 1 through FIG. 3.

An operation example of the plug-in automatic reconfiguration unit according to Embodiment 20 will now be explained referring to FIG. 12.

Although the case of actually deleting a plug-in module has been described in the above Embodiments, it can be considered depending on a system form that a plug-in module is not deleted but evacuated to a storage area which a receiving terminal can easily access.

For example, if actually downloading a certain plug-in module from the server A takes ten seconds, and on the other hand, re-obtaining the certain plug-in module from the server B to which the certain plug-in module has evacuated takes five seconds, it can be executed that the file of the certain plug-in module is evacuated to the server B and deleted from the receiving terminal 100 later. In this case, the load of re-downloading the plug-in module becomes small, which is convenient for a user and a system.

Then, the following operation is performed according to Embodiment 20. Most of the operations are the same as those described in the Embodiment 1. However, when the plug-in deletion unit 6 deletes a plug-in module, the deletion of the plug-in module is performed from the receiving terminal 100 after evacuating the plug-in module by using the data-inside-receiving-apparatus storage unit 14. Information about plug-in module evacuation is stored in the plug-in management unit 3. Furthermore, when the plug-in download unit 5 downloads a plug-in module, the plug-in management unit 3 is checked to find whether the plug-in module is evacuated or not. When evacuated, the plug-in download unit 5 downloads evacuated data using the stored data receiving unit 15. When not evacuated, the plug-in download unit 5 downloads from an actual plug-in module providing server.

By dint of the above operation, in the process of re-downloading a plug-in module, it is possible to obtain the plug-in module from a storage area which is easy to access than an actual module providing server and whose access load is low. Accordingly, the plug-in automatic reconfiguration unit where re-download load is low can be provided.

The receiving terminal 100 is not limited to the personal computer (PC). For example, built-in equipment, such as a cellular phone, a car-navigation system, and a PDA, can be the receiving terminal 100. Server equipment such as a web server in which the storage area of the data-inside-receiving-apparatus storage unit 14 is installed can be the transmitting apparatus. Moreover, a web system composed of these built-in equipment and server equipment can be the system. Furthermore, it is acceptable to use a computer program utilized for a browser, as each unit mentioned above.

As mentioned above, the plug-in automatic reconfiguration unit included in the browser according to Embodiment 20 further includes the data-inside-receiving-apparatus storage unit 14 and the stored data receiving unit 15, and has the following features in addition to the browser described in Embodiment 1.

The data-inside-receiving-apparatus storage unit 14 can store some data in the receiving terminal into a specific storage area in a network.

The stored data receiving unit 15 can input the stored data-inside-receiving-apparatus into the receiving apparatus again.

The plug-in deletion unit 6 deletes the plug-in module A (or a part of the division file of the plug-in module A), being a candidate for deletion, after once storing the plug-in module A (or a part of the division file of the plug-in module A) by using the data-inside-receiving-apparatus storage unit 14. Then, when the plug-in module A is needed again, the restoration of the plug-in module A is performed by using the stored data receiving unit 15.

The communications apparatus according to Embodiment 20 is the receiving apparatus and the transmitting apparatus including a browser having the plug-in automatic reconfiguration. The system is composed of the receiving apparatus and the transmitting apparatus.

Namely, the communications apparatus according to Embodiment 20 further includes:

the plug-in storage unit which outputs a specific plug-in module stored in the memory storage to a different memory storage and makes the specific plug-in module stored, and when the plug-in module judged by the plug-in judgement unit is the specific plug-in module stated above, the stored plug-in input unit which inputs the specific plug-in module from the different memory storage to which the specific plug-in module has been output by the plug-in storage unit.

Embodiment 21

Figure 13:
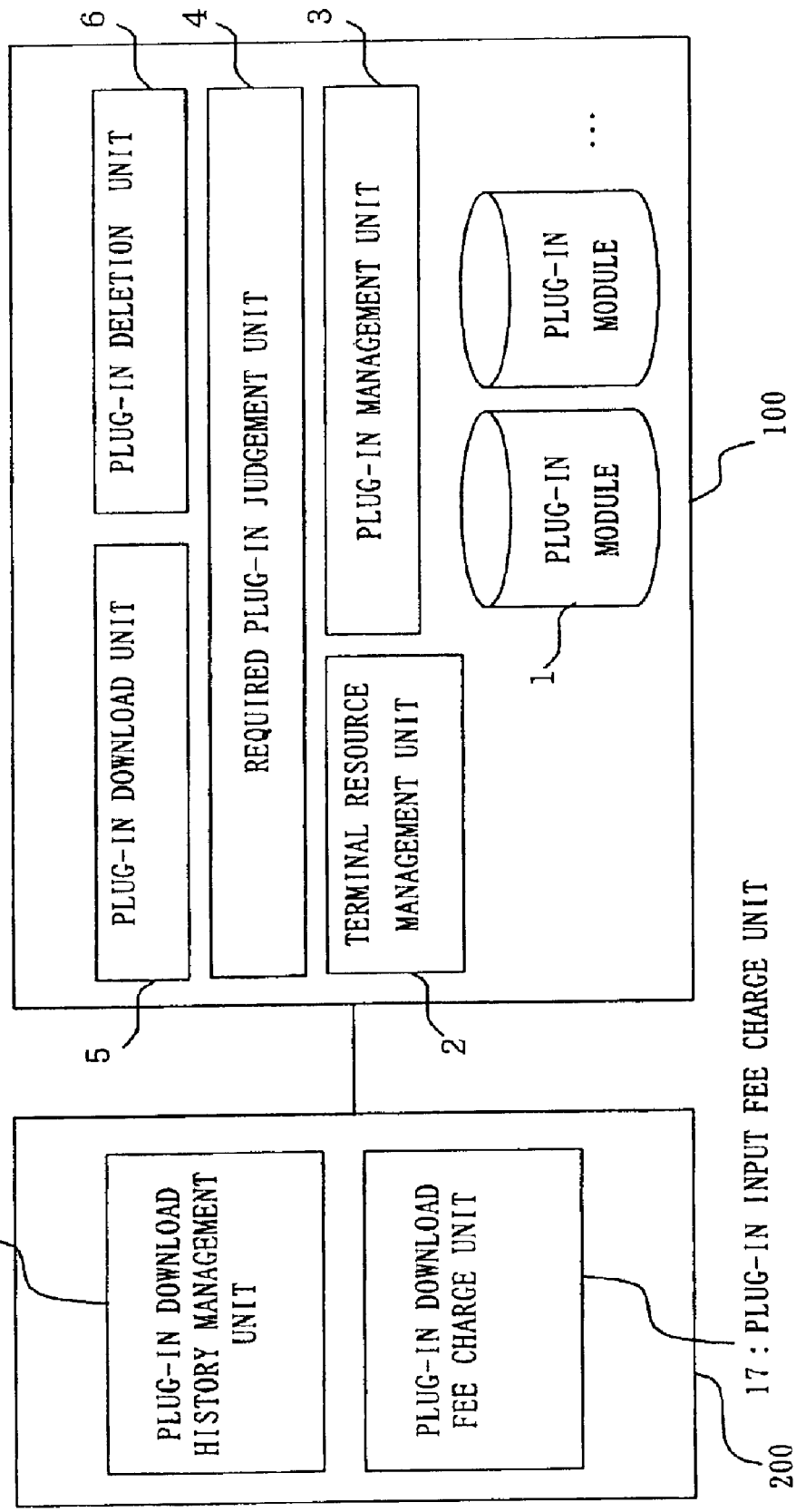
FIG. 13 is a block diagram showing an example of a configuration of a plug-in automatic reconfiguration unit according to Embodiment 21.

FIG. 13 is a block diagram showing a configuration example of the plug-in automatic reconfiguration unit according to Embodiment 21. In FIG. 13, are shown a plug-in download history management unit 16 (an example of a plug-in input history management unit) which manages history information on a plug-in module downloaded by the receiving terminal, and a plug-in download fee charge unit 17 (an example of a plug-in input fee charge unit) by which a network use at the time of plug-in download can be charged.

The transmitting terminal 200 as well as the receiving terminal 100 includes each configuration element as shown in FIGS. 1 and 2.

Other configurations are the same as those described in FIG. 1 through FIG. 3.

An operation example of the plug-in automatic reconfiguration unit according to Embodiment 21 will now be explained referring to FIG. 13.

In the above Embodiments, it has not been taken into consideration about a charge method of a network use fee at the time of re-downloading a plug-in module. If a plug-in module is deleted by the plug-in automatic reconfiguration according to the Embodiments, it is possible to obtain an advantage of effectively using the H/W resource of a receiving terminal. However, if a user is charged a network use fee whenever re-download of a plug-in module is performed, it is inconvenient for the user. Then, the following operation is performed according to Embodiment 21. Although most of the operations are the same as those described in the Embodiment 1, the operation of the plug-in download unit 5 differs as follows:

When the plug-in download unit 5 downloads a plug-in module, the plug-in download history management unit 16 is first checked to judge whether the plug-in module is downloaded for the first time or not. (If no history exists, it is the first time for the plug-in module to be downloaded, and if a history exists, it is the second or more than second time for the plug-in module to be downloaded.) When downloading a plug-in module for the first time, a history is recorded in the plug-in download history management unit 16 and a network use fee is charged by the plug-in download fee charge unit 17. In the case of downloading for the second time or more than second (that is the case of re-downloading because the plug-in deletion unit 6 has performed deletion), the download is performed without charging the network use fee.

In the processing from deleting a plug-in module through re-downloading it, by dint of the above operation, it is not necessary for the user to pay the network use fee which has been already paid at the time of the first download. Therefore, the plug-in automatic reconfiguration unit suitable for the user can be provided.

The receiving terminal 100 is not limited to the personal computer (PC). For example, built-in equipment, such as a cellular phone, a car-navigation system, and a PDA, can be the receiving terminal 100. Server equipment such as a web server in which the plug-in download history management unit 16 and the plug-in download fee charge unit 17 are installed can be the transmitting terminal 200. Moreover, a web system composed of these built-in equipment and server equipment can be the system. Furthermore, it is acceptable to use a computer program utilized for a browser, as each unit mentioned above.

As mentioned above, the plug-in automatic reconfiguration unit included in the browser according to Embodiment 21 further includes the plug-in download history management unit 16 and the plug-in download fee charge unit 17, and has the following features in addition to the browser described in Embodiment 1.

The plug-in download history management unit 16 manages history information on a plug-in module downloaded by the receiving terminal 100.

The plug-in download fee charge unit 17 charges a network use fee at the time of downloading a plug-in module. Moreover, the plug-in download fee charge unit 17 charges the network use fee only when downloading the plug-in module for the first time, and does not charge the network use fee when re-downloading the plug-in module which once deleted in the plug-in automatic reconfiguration.

The communications apparatus according to Embodiment 21 is the receiving apparatus and the transmitting apparatus including a browser having the plug-in automatic reconfiguration. The system is composed of the receiving apparatus and the transmitting apparatus.

Namely, the communications apparatus according to Embodiment 21 includes:

the plug-in judgement unit for judging a plug-in module required for specific contents;

the plug-in deletion unit, when a specific amount of a memory storage, whose capacity is the specific amount and which has stored a specific plug-in module, is insufficient to further store the plug-in module judged by the plug-in judgement unit, the plug-in deletion unit deletes the specific plug-in module having been stored in the memory storage;

the plug-in input unit for inputting the plug-in module judged by the plug-in judgement unit to be stored in the memory storage where the specific plug-in module has been deleted by the plug-in deletion unit in order to have an empty space for storing the input plug-in module; and the plug-in input fee charge unit for charging a fee when the plug-in module is input by the plug-in input unit.

Then, the communication system according to Embodiment 21 further includes:

the plug-in input history management unit for managing history information on the plug-in module input by the plug-in input unit, wherein the plug-in input fee charge unit charges a fee when the plug-in module is input by the plug-in input unit for the first time, based on the history information on the plug-in module managed by the plug-in input history management unit.

Embodiment 22

Figure 14:
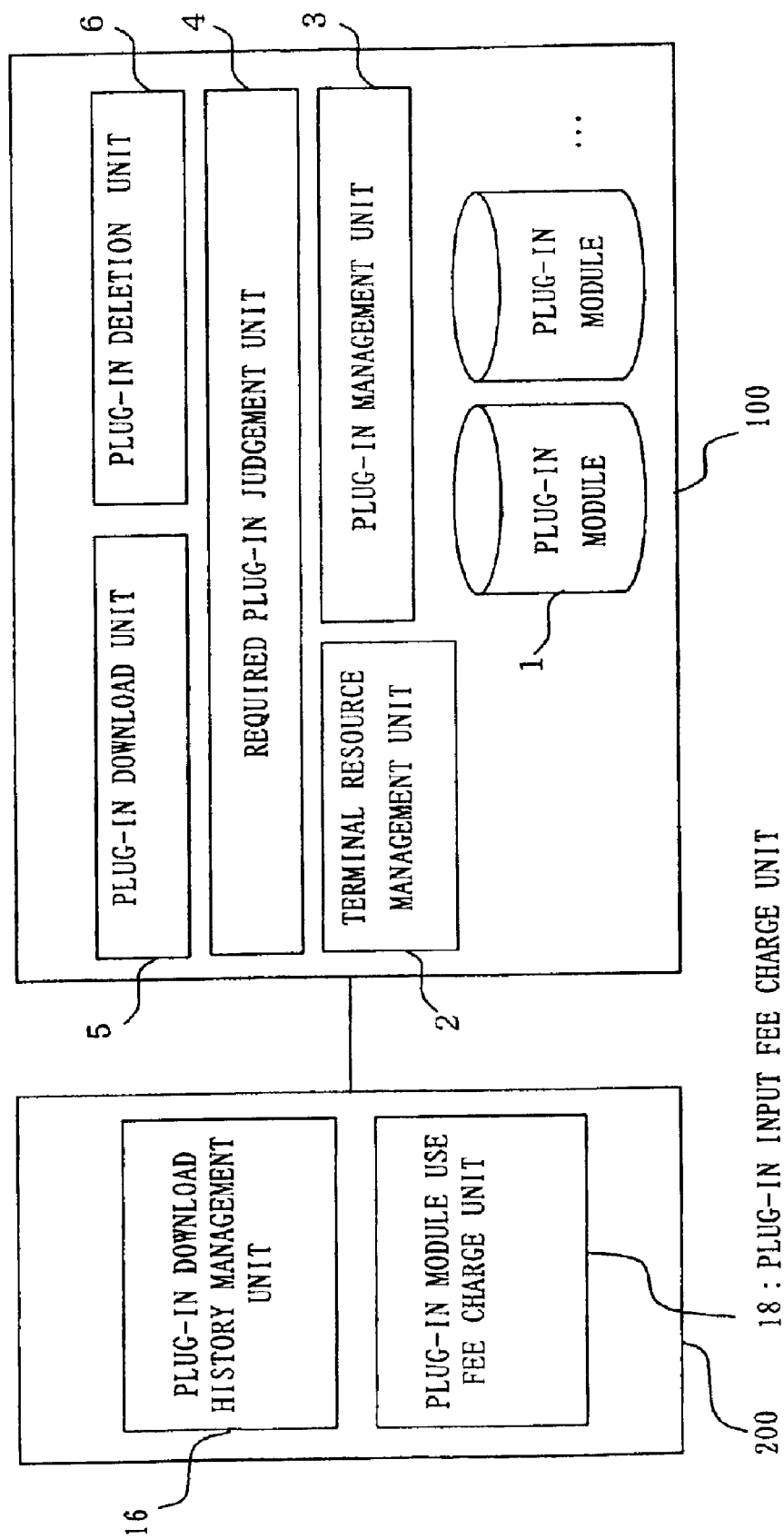
FIG. 14 is a block diagram showing an example of a configuration of a plug-in automatic reconfiguration unit according to Embodiment 22.

FIG. 14 is a block diagram showing a configuration example of the plug-in automatic reconfiguration unit according to Embodiment 22. In FIG. 14, it is shown a plug-in module use fee charge unit 18 (an example of the plug-in input fee charge unit) which charges a plug-in module to be downloaded at the time of downloading the plug-in module.

Other configurations are the same as those described in FIGS. 1, 2 and 13.

An operation example of the plug-in automatic reconfiguration unit according to Embodiment 22 will now be explained referring to FIG. 14.

In the above Embodiments, it has not been taken into consideration about a charge method of a plug-in module itself at the time of re-downloading the plug-in module. If a plug-in module is deleted by the plug-in automatic reconfiguration according to Embodiments 1 through 21, it is possible to obtain an advantage of effectively using the H/W resource of a receiving terminal. However, if a user is charged a plug-in module use fee whenever re-download of the plug-in module is performed, it is inconvenient for the user. Then, the following operation is performed according to Embodiment 22. Although most of the operations are the same as those described in the Embodiment 1, the operation of the plug-in download unit 5 differs as follows:

When the plug-in download unit 5 downloads a plug-in module, the plug-in download history management unit 16 is first checked to judge whether the plug-in module is downloaded for the first time or not. (If no history exists, it is the first time for the plug-in module to be downloaded, and if a history exists, it is the second or more than second time for the plug-in module to be downloaded.) When downloading a plug-in module for the first time, a history is recorded in the plug-in download history management unit 16 and a plug-in module use fee is charged by the plug-in module use fee charge unit 18. In the case of downloading for the second time or more than second (that is the case of re-downloading because the plug-in deletion unit 6 has performed deletion), the download is performed without charging a plug-in module use fee.

In the processing from deleting a plug-in module through re-downloading it, by dint of the above operation, it is not necessary for the user to pay the plug-in module use fee which has been already paid at the time of the first download. Therefore, the plug-in automatic reconfiguration unit suitable for the user can be provided.

The receiving terminal 100 is not limited to the personal computer (PC). For example, built-in equipment, such as a cellular phone, a car-navigation system, and a PDA, can be the receiving terminal 100. Server equipment such as a web server in which the plug-in download history management unit 16 and the plug-in module use fee charge unit 18 are installed can be the transmitting terminal 200. Moreover, a web system composed of these built-in equipment and server equipment can be the system. Furthermore, it is acceptable to use a computer program utilized for a browser, as each unit mentioned above.

As mentioned above, the plug-in automatic reconfiguration unit included in the browser according to Embodiment 22 further includes the plug-in download history management unit 16 and the plug-in module use fee charge unit 18, and has the following features in addition to the browser described in Embodiment 1.

The plug-in download history management unit 16 manages history information on a plug-in module downloaded by the receiving terminal 100.

The plug-in module use fee charge unit 18 charges a plug-in module to be downloaded at the time of downloading a plug-in module. Moreover, the plug-in module use fee charge unit 18 charges the plug-in module use fee only when downloading the plug-in module for the first time, and does not charge the plug-in module use fee when re-downloading the plug-in module which once deleted in the plug-in automatic reconfiguration.

The communications apparatus according to Embodiment 22 is the receiving apparatus and the transmitting apparatus including a browser having the plug-in automatic reconfiguration. The system is composed of the receiving apparatus and the transmitting apparatus.

Namely, the communications apparatus according to Embodiments 21 and 22 includes:

the plug-in input unit which inputs a plug-in module through a network, and the plug-in input fee charge unit which charges at least one of the network use fee and the plug-in module use fee at the time of inputting the plug-in module.

Embodiment 23

Figure 15:
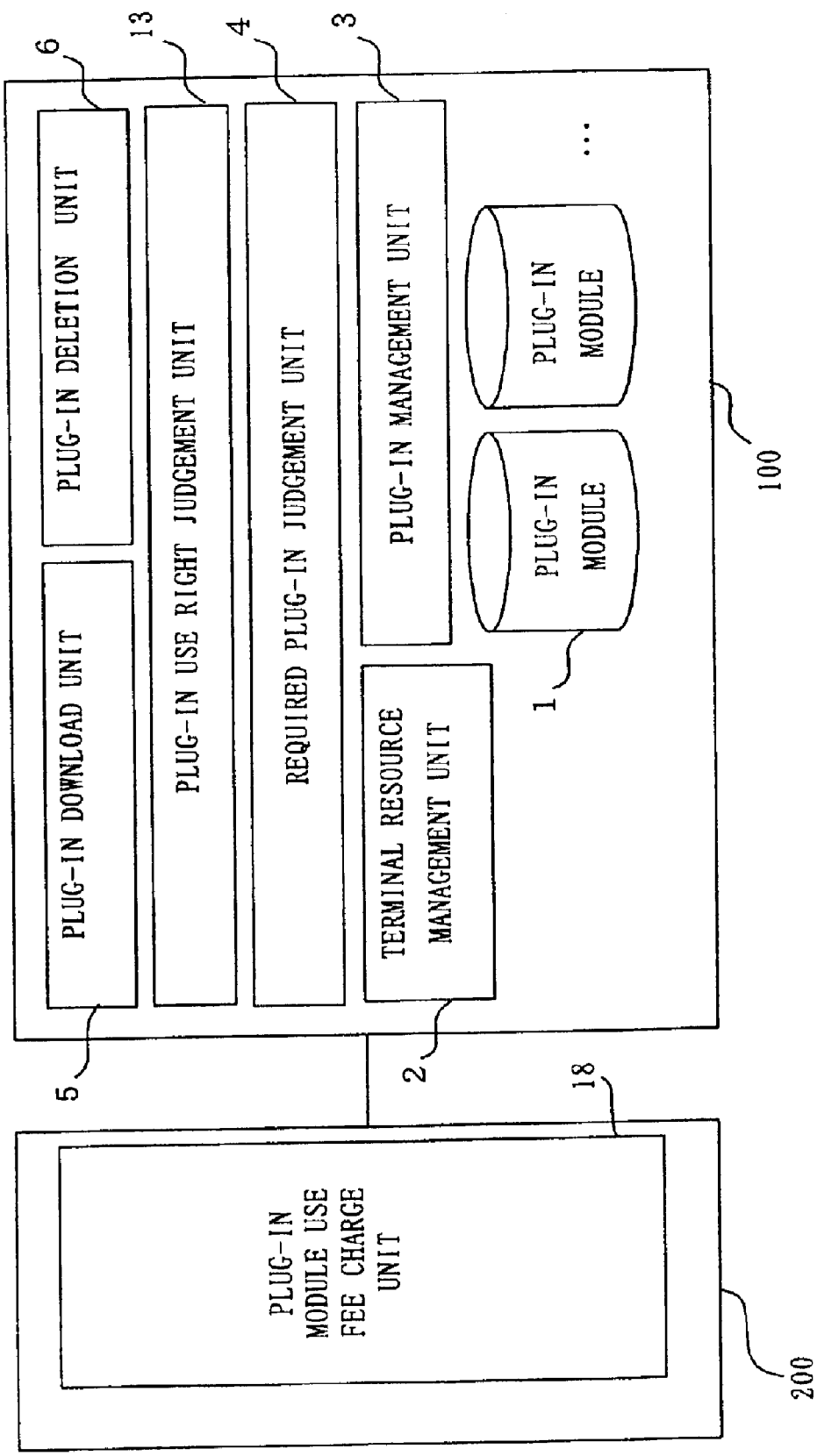
FIG. 15 is a block diagram showing an example of a configuration of a plug-in automatic reconfiguration unit according to Embodiment 23.

FIG. 15 is a block diagram showing a configuration example of the plug-in automatic reconfiguration unit according to Embodiment 23. Each configuration is the same as that of FIGS. 1, 2, 3, 11, and 14.

An operation example of the plug-in automatic reconfiguration unit according to Embodiment 23 will now be explained referring to FIG. 15.

In Embodiment 14, it is not taken into consideration about a charge method of a plug-in module itself at the time of re-downloading the plug-in module. Then, the following operation is performed for charging the fee according to Embodiment 23. Although most of the operations are the same as those described in the Embodiment 14, the operations of the plug-in download unit 5 and the plug-in deletion unit 6 differ from those in Embodiment 14 as follows:

When the plug-in download unit 5 downloads a plug-in module, the plug-in module itself is charged by the plug-in module use fee charge unit 18. The plug-in deletion unit 6 deletes only a plug-in module whose use right is judged to be dissatisfied by the plug-in use right judgement unit 13. By dint of the above operation, it is possible to suitably charge the re-downloading of a plug-in module whose use right has not been satisfied.

The receiving terminal 100 is not limited to the personal computer (PC). For example, built-in equipment, such as a cellular phone, a car-navigation system, and a PDA, can be the receiving terminal 100. Server equipment such as a web server in which the plug-in module use fee charge unit 18 is installed can be the transmitting terminal 200. Moreover, a web system composed of these built-in equipment and server equipment can be the system. Furthermore, it is acceptable to use a computer program utilized for a browser, as each unit mentioned above.

As mentioned above, the plug-in automatic reconfiguration unit according to Embodiment 23 includes the plug-in module use fee charge unit 18, and has the following features:

the plug-in module use fee charge unit 18 which charges a plug-in module to be downloaded at the time of downloading the plug-in module, wherein the plug-in deletion unit 6 deletes only a plug-in module which has become a deletion candidate based on a use right judgement, and the plug-in module use fee charge unit 18 charges the plug-in module whenever the plug-in module is downloaded.

The communications apparatus according to Embodiment 23 is the receiving apparatus and the transmitting apparatus including a browser having the plug-in automatic reconfiguration. The system is composed of the receiving apparatus and the transmitting apparatus.

Accordingly, the above-stated Embodiments relate to the following technology:

when it is impossible to download a new plug-in module because of a resource lacking in built-in equipment, such as a cellular phone, whose H/W resource is not enough, a plug-in module not used by a browser is automatically deleted in order to appropriately set a plug-in module configuration.

Namely, when the download of a new plug-in module becomes impossible by the shortage of a resource, the browser automatically specifies and deletes the plug-in module which is not needed at the time, and downloads a new plug-in module by using an empty resource made by deleting the unnecessary plug-in module.

Regarding the "unit" explained in each of the above Embodiments, a part of the unit or all of the unit can be configured by a program executable by a computer. That is, the magnetic disc unit 46 is a recording medium in which a computer-executable program is recorded. These programs can be created by the C language. It is also acceptable to use HTML, SGML, or XML. A screen display can be performed by using JAVA (registered trademark).

Moreover, the "unit" explained in each of the above Embodiments can be realized by firmware stored in the ROM 39. It is also acceptable to execute the "unit" explained in each of the above Embodiments by using software, hardware, or a combination of software, hardware and firmware.

Moreover, the program which executes each of the above Embodiments may use a recording apparatus made by other recording medium, such as FD (Flexible Disc), an optical disc, and CD (compact disc), MD (mini disc), and DVD (Digital Versatile Disc), instead of the magnetic disc unit 46. Furthermore, instead of the CRT display apparatus 41, other display apparatus or output apparatus, such as the printer 87, can be used.

According to at least one of the above Embodiments, the plug-in automatic reconfiguration in which a little resource is effectively utilized can be provided.

According to at least one of the above Embodiments, the plug-in automatic reconfiguration unit efficiently utilizing a limited HUV resource to the maximum can be provided.

According to at least one of the above Embodiments, it is possible to download a new plug-in module by utilizing an empty resource.

According to at least one of the above Embodiments, the next plug-in reconfiguration can be performed.

According to at least one of the above Embodiments, it is possible to delete plug-in modules in order starting from the plug-in module which is not to be used from now on. Therefore, the opportunity of re-downloading plug-in modules can be reduced.

According to at least one of the above Embodiments, it is possible to delete plug-in modules in order starting from the plug-in module which is rarely to be used. Therefore, the opportunity of re-downloading plug-in modules can be reduced.

According to at least one of the above Embodiments, it is possible to delete plug-in modules in order starting from the plug-in module which may not be used based on the latest use frequency. Therefore, the opportunity of re-downloading plug-in modules can be reduced.

According to at least one of the above Embodiments, it is possible to reduce the number of plug-in modules to be deleted as much as possible. Therefore, the opportunity of re-downloading plug-in modules can be reduced.

According to at least one of the above Embodiments, it is possible to reduce the total size of plug-in module files to be deleted as much as possible. Therefore, a network load at the time of re-downloading the plug-in modules and the time required for re-downloading the plug-in modules can be reduced.

According to at least one of the above Embodiments, it is possible to delete plug-in modules in order starting from the plug-in module whose time required for downloading is the shortest. Therefore, the time required for re-downloading plug-in modules can be reduced.

According to at least one of the above Embodiments, it is possible to delete plug-in modules in order starting from the plug-in module whose download fee is the lowest. Therefore, the fee required at the time of re-downloading a plug-in module can be reduced.

According to at least one of the above Embodiments, it is possible not to delete a plug-in module which may be frequently accessed by the operation of the user's "go" and "go back".

According to at least one of the above Embodiments, the opportunity of deleting a common processing module can reduced. Therefore, the load of re-downloading plug-in modules can be reduced.

According to at least one of the above Embodiments, it is possible to delete only a part required to be deleted.

According to at least one of the above Embodiments, re-downloading can be attained by downloading an amount smaller than the case of performing the whole deletion of a plug-in module. Therefore, the load of re-downloading the plug-in module can be reduced.

According to at least one of the above Embodiments, it is possible to reduce plug-in modules whose use frequencies are high, as much as possible.

According to at least one of the above Embodiments, it is possible for the transmission side to customize deletion priority determination logic by using the module for determining deletion priority. Accordingly, the plug-in automatic reconfiguration unit highly customizable can be provided.

According to at least one of the above Embodiments, it is possible to each time delete an unexecutable plug-in module whose use right is not satisfied. Therefore, the plug-in automatic reconfiguration unit where a restricted H/W resource is utilized to the maximum can be provided.

According to at least one of the above Embodiments, it is possible to each time delete an unexecutable plug-in module whose use right regarding use times is not satisfied. Therefore, the plug-in automatic reconfiguration unit where a restricted H/W resource is utilized to the maximum can be provided.

According to at least one of the above Embodiments, it is possible to each time delete an unexecutable plug-in module whose use right regarding total processing time-period is not satisfied. Therefore, the plug-in automatic reconfiguration unit where a restricted H/W resource is utilized to the maximum can be provided.

According to at least one of the above Embodiments, it is possible to each time delete an unexecutable plug-in module whose use right regarding total data size of the plug-in module having processed is not satisfied. Therefore, the plug-in automatic reconfiguration unit where a restricted H/W resource is utilized to the maximum can be provided.

According to at least one of the above Embodiments, it is possible to each time delete an unexecutable plug-in module whose use right regarding use-expiration-date of the plug-in module is not satisfied. Therefore, the plug-in automatic reconfiguration unit where a restricted H/W resource is utilized to the maximum can be provided.

According to at least one of the above Embodiments, it is possible to each time delete an unexecutable plug-in module whose use right regarding lapsed time from starting using the plug-in module up to the current time is not satisfied. Therefore, the plug-in automatic reconfiguration unit where a restricted H/W resource is utilized to the maximum can be provided.

According to at least one of the above Embodiments, in the process of re-downloading a plug-in module, it is possible to obtain the plug-in module from a storage area which is easy to access than an actual module providing server and whose access load is low. Accordingly, the plug-in automatic reconfiguration unit where re-download load is low can be provided.

According to at least one of the above Embodiments, it is possible to appropriately charge a fee for re-downloading a plug-in module whose use right has been lost.

According to at least one of the above Embodiments, it is possible not to pay a fee for downloading a plug-in module for the second or more than second time.

According to at least one of the above Embodiments, in the processing from deleting a plug-in module through re-downloading it, it is not necessary for the user to pay the network use fee which has been already paid at the time of the first download. Therefore, the plug-in automatic reconfiguration unit suitable for the user can be provided.

In the processing from deleting a plug-in module through re-downloading it, it is not necessary for the user to pay the plug-in module use fee which has been already paid at the time of the first download. Therefore, the plug-in automatic reconfiguration unit suitable for the user can be provided.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A communications apparatus, comprising:
   a plug-in judgement unit to judge whether a plug-in module is required for specific contents; and
   a plug-in deletion unit, wherein when a specific amount of a memory storage, whose capacity is the specific amount and which has stored a specific plug-in module, is insufficient to further store the plug-in module judged by the plug-in judgement unit, the plug-in deletion unit to delete the specific plug-in module from the memory storage.

2. The communications apparatus of claim 1, further comprising:
   a resource management unit to manage the specific amount of the memory storage; and
   a plug-in management unit to manage the specific plug-in module stored in the memory storage,
   wherein the plug-in deletion unit deletes the specific plug-in module stored in the memory storage, based on the specific amount of the memory storage managed by the resource management unit and the specific plug-in module managed by the plug-in management unit.

3. The communications apparatus of claim 1, further comprising:
   a plug-in input unit to input the plug-in module judged by the plug-in judgement unit, wherein the input plug-in module to be stored in the memory storage where the specific plug-in module has been deleted by the plug-in deletion unit to have space for storing the input plug-in module.

4. The communications apparatus of claim 3, wherein
   the plug-in input unit registers the input plug-in module in the plug-in management unit, and the plug-in management unit manages the registered, input plug-in module.

5. The communications apparatus of claim 2, wherein
   the plug-in management unit manages a plurality of plug-in modules and a last use date/time for each of the plurality of plug-in modules, and
   the plug-in deletion unit selects a plurality of plug-in modules differing from the plug-in module judged by the plug-in judgement unit, from the plurality of plug-in modules managed by the plug-in management unit, and deletes a plug-in module in order of priority relating to last use date/time starting from a plug-in module whose last use date/time is the oldest for the plurality of plug-in modules selected by the plug-in deletion unit.

6. The communications apparatus of claim 2, wherein
   the plug-in management unit manages a plurality of plug-in modules and a use frequency for each of the plurality of plug-in modules, and
   the plug-in deletion unit selects a plurality of plug-in modules differing from the plug-in module judged by the plug-in judgement unit, from the plurality of plug-in modules managed by the plug-in management unit, and deletes a plug-in module in order of priority relating to use frequency starting from a plug-in module whose use frequency is the lowest for the plurality of plug-in modules selected by the plug-in deletion unit.

7. The communications apparatus of claim 2, wherein
   the plug-in management unit manages a plurality of plug-in modules and a use frequency during a specific term of each of the plurality of plug-in modules, and
   the plug-in deletion unit selects a plurality of plug-in modules differing from the plug-in module judged by the plug-in judgement unit, from the plurality of plug-in modules managed by the plug-in management unit, and deletes a plug-in module in order of priority relating to use frequency during the specific term starting from a plug-in module whose use frequency during the specific term is the lowest for the plurality of plug-in modules selected by the plug-in deletion unit.

8. The communications apparatus of the claim 2, wherein
   the plug-in management unit manages a plurality of plug-in modules and size for each of the plurality of plug-in modules, and
   the plug-in deletion unit selects a plurality of plug-in modules differing from the plug-in module judged by the plug-in judgement unit, from the plurality of plug-in modules managed by the plug-in management unit, and deletes a plug-in module in order of priority relating to size starting from a plug-in module whose size is the largest for the plurality of plug-in modules selected by the plug-in deletion unit.

9. The communications apparatus of claim 2, wherein
the plug-in management unit manages a plurality of plug-in modules, and a last use date/time, a use frequency and a use frequency during a specific term for each of the plurality of plug-in modules, and
from the plurality of plug-in modules which are managed by the plug-in management unit and differ from the plug-in module judged by the plug-in judgement unit,
the plug-in deletion unit selects a first group relating to last use date/time composed of at least one plug-in module whose last use date/time is older than at least one other plug-in module, based on priority data regarding last use date/time, a first group relating to use frequency composed of at least one plug-in module whose use frequency is lower than at least one other plug-in module, based on priority data regarding use frequency, and a first group regarding use frequency during a specific term composed of at least one plug-in module whose use frequency during a specific term is lower than at least one other plug-in module, based on priority data regarding use frequency during the specific term, and
the plug-in deletion unit selects a second group relating to last use date/time composed of at least one plug-in module whose last use date/time is older than that of a specified plug-in module in the first group relating to last use date/time, a second group relating to use frequency composed of at least one plug-in module whose use frequency is lower than that of the specified plug-in module in the first group regarding use frequency, and a second group relating to use frequency during the specific term composed of at least one plug-in module whose use frequency during the specific term is lower than that of the specified plug-in module in the first group relating to use frequency during the specific term, and
deletes a group having the smallest number of plug-in modules from the second groups selected above.

10. The communications apparatus of claim 2, wherein
the plug-in management unit manages a plurality of plug-in modules, and a last use date/time, a use frequency, a use frequency during a specific term, and size for each of the plurality of plug-in modules, and
from the plurality of plug-in modules which are managed by the plug-in management unit and differ from the plug-in module judged by the plug-in judgement unit,
the plug-in deletion unit selects a plurality of plug-in modules whose last use dates/time are older than at least one other plug-in module, based on priority data relating to last use date/time, a plurality of plug-in modules whose use frequencies are lower than at least one other plug-in module, based on priority data relating to use frequency, and a plurality of plug-in modules whose use frequencies during a specific term are lower than at least one other plug-in module, based on priority data relating to use frequency during the specific term, and
deletes a plurality of plug-in modules having the smallest total amount of priority not to be deleted, by giving these plurality of plug-in modules deletion priority, from the plurality of plug-in modules selected.

11. The communications apparatus of claim 2, wherein
the plug-in management unit manages a plurality of plug-in modules and an input time for each of the plurality of plug-in modules, and
the plug-in deletion unit selects a plurality of plug-in modules differing from the plug-in module judged by the plug-in judgement unit, from the plurality of plug-in modules managed by the plug-in management unit, and deletes a plug-in module in order of priority data relating to input time starting from a plug-in module whose input time is the shortest, from the plurality of plug-in modules selected by the plug-in deletion unit.

12. The communications apparatus of claim 2, wherein
the plug-in management unit manages a plurality of plug-in modules and a required fee for inputting each of the plurality of plug-in modules, and
the plug-in deletion unit selects a plurality of plug-in modules differing from the plug-in module judged by the plug-in judgement unit, from the plurality of plug-in modules managed by the plug-in management unit, and deletes a plug-in module in order of priority data relating to the required fee for inputting starting from a module whose required fee is the lowest for the plurality of plug-in modules selected by the plug-in deletion unit.

13. The communications apparatus of claim 2, further comprising:
a plug-in-inside-history management unit which manages display histories of a plurality of contents, inputs plug-in modules judged by the plug-in judgement unit, manages a plurality of times, and specifies a plug-in module required for each of the plurality of contents corresponding to managed display histories, wherein
the plug-in management unit manages a plurality of plug-in modules, and
the plug-in deletion unit deletes at least one plug-in module, with the exception of the at least one plug-in module being required for each of the plurality of contents corresponding to the display histories managed by the plug-in-inside-history management unit, from the plurality of plug-in modules managed by the plug-in management unit.

14. The communications apparatus of claim 2, further comprising:
a plug-in-inside-history management unit which manages display histories of a plurality of contents, inputs plug-in modules judged by the plug-in judgement unit, manages a plurality of times, and specifies a plug-in module required for each of the plurality of contents corresponding to managed display histories, wherein
the plug-in management unit manages a plurality of plug-in modules, and
the plug-in deletion unit selects a plurality of plug-in modules differing from a current plug-in module judged by the plug-in judgement unit, from the plurality of plug-in modules managed by the plug-in management unit, and when there is a common plug-in module required by a plurality of contents corresponding to a display history managed by the plug-in-inside-history management unit and particular plug-in modules required for each of the plurality of contents corresponding to the display history managed by the plug-in-inside-history management unit, the plug-in deletion unit deletes the particular plug-in modules, by giving deletion priority to the particular plug-in modules, from the plurality of plug-in modules selected.

15. The communications apparatus of claim 2, wherein
when a lack of space for newly storing a plug-in module, judged by the plug-in judgement unit, in the memory storage can be compensated for by deleting a portion of a specific plug-in module stored in the memory storage, the plug-in deletion unit divides the specific plug-in module into two portions and deletes one of the two portions.

16. The communications apparatus of claim 15, wherein
the plug-in management unit manages a division position of plug-in modules where the specific plug-in module has been divided by the plug-in deletion unit, and the communications apparatus further includes an input-start-position specifying and inputting unit which inputs a deleted portion of the specific plug-in module, deleted by the plug-in deletion unit, based on the division position managed by the plug-in management unit.

17. The communications apparatus of claim 2, further comprising:

a plug-in information input unit to input plug-in information to be used, wherein the plug-in management unit manages a plurality of plug-in modules, and the plug-in deletion unit selects a plurality of plug-in modules differing from the plug-in module judged by the plug-in judgement unit, from the plurality of plug-in modules managed by the plug-in management unit, and decides a plug-in module is to be deleted, based on the plug-in information input by the plug-in information input unit, from the plurality of plug-in modules selected.

18. The communications apparatus of claim 2, further comprising:

a deletion priority information input unit for inputting plug-in-deletion-priority-information including priority information for deleting a plug-in module, wherein the plug-in management unit manages a plurality of plug-in modules, and the plug-in deletion unit selects a plurality of plug-in modules differing from the plug-in module judged by the plug-in judgement unit, from the plurality of plug-in modules managed by the plug-in management unit, and determines that a plug-in module is to be deleted based on the plug-in-deletion-priority-information, from the plurality of plug-in modules selected by the plug-in deletion unit.

19. The communications apparatus of claim 2, further comprising:

the plug-in management unit manages a plurality of plug-in modules and use right information for each of the plurality of plug-in modules, a plug-in use right judgement unit which judges whether a use right exists for each of the plurality of plug-in modules managed by the plug-in management unit, based on the use right information managed by the plug-in management unit, wherein the plug-in deletion unit deletes a plug-in module for which no use right exists from the plurality of plug-in modules managed by the plug-in management unit.

20. The communications apparatus of claim 19, wherein
the plug-in use right judgement unit outputs modified use right information when the use right information managed by the plug-in management unit changes, and the plug-in management unit registers the modified use right information being output.

21. The communications apparatus of claim 19, wherein
the use right information includes usable-times information, wherein the plug-in use right judgement unit judges whether a value of usable-times for each of the plurality of plug-in modules managed by the plug-in management unit is greater than equal to zero, and the plug-in deletion unit deletes a plug-in module whose value of usable-times has been judged to be equal to zero from the plurality of plug-in modules managed by the plug-in management unit.

22. The communications apparatus of claim 19, wherein
the use right information includes usable-time-period information, wherein the plug-in use right judgement unit judges whether a value of usable-time-period for each of the plurality of plug-in modules managed by the plug-in management unit is greater than or equal to zero, and the plug-in deletion unit deletes a plug-in module whose value of usable-time-period has been judged to be equal to zero from the plurality of plug-in modules managed by the plug-in management unit.

23. The communications apparatus of claim 19, wherein
each of the plurality of plug-in modules managed by the plug-in management unit processes data of a data-processing-size, the use right information includes possible-data-processing-size information, the plug-in use right judgement unit judges whether a value of possible-data-processing-size for each of the plurality of plug-in modules managed by the plug-in management unit is greater than or equal to zero, and the plug-in deletion unit deletes a plug-in module whose value of possible-data-processing-size has been judged to be equal to zero from the plurality of plug-in modules managed by the plug-in management unit.

24. The communications apparatus of claim 19, wherein
the use right information includes use-expiration-date information, the plug-in use right judgement unit judges whether a use-expiration-date for each of the plurality of plug-in modules managed by the plug-in management unit has expired, and the plug-in deletion unit deletes a plug-in module whose use-expiration-date is judged to have passed by the plug-in use right judgement unit from the plurality of plug-in modules managed by the plug-in management unit.

25. The communications apparatus of claim 19, wherein
the use right information includes usable-period information, the plug-in use right judgement unit judges whether a usable-period for each of the plurality of plug-in modules managed by the plug-in management unit has expired, and the plug-in deletion unit deletes a plug-in module whose usable-period is judged to have passed by the plug-in use right judgement unit from the plurality of plug-in modules managed by the plug-in management unit.

26. The communications apparatus of claim 1, further comprising:

a plug-in storage unit to output the specific plug-in module stored in the memory storage and store in a different memory storage to input the specific plug-in module, stored in the different memory storage, when the plug-in module judged by the plug-in judgement unit is the specific plug-in module.

27. A communications apparatus, comprising:

a plug-in judgement unit to judge whether a plug-in module is required for specific contents;

a plug-in deletion unit, wherein when a specific amount of a memory storage, whose capacity is the specific amount and which has stored a specific plug-in module, is insufficient to further store the plug-in module judged by the plug-in judgement unit, the plug-in deletion unit to delete the specific plug-in module from the memory storage;

a plug-in input unit to input the plug-in module judged by the plug-in judgement unit, wherein the input plug-in module to be stored in the memory storage where the specific plug-in module being deleted by the plug-in deletion unit to have space for storing the input plug-in module; and a plug-in input fee charge unit for charging a fee when the plug-in module is input by the plug-in input unit.

28. The communications apparatus of claim 27, further comprising:

a plug-in input history management unit to manage history information on the plug-in module input by the plug-in input unit, wherein the plug-in input fee charge unit charges a fee when the plug-in module is input for the first time, based on the history information on the plug-in module managed by the plug-in input history management unit.

29. The communications apparatus of claim 27, wherein the plug-in input unit inputs the plug-in module through a network, and the plug-in input fee charge unit charges at least one of a network use fee and a plug-in module use fee at time of inputting the plug-in module.

30. A plug-in module control method, comprising:

judging whether a plug-in module is required for specific contents; and deleting a specific plug-in module having been stored in a memory storage when a specific amount of the memory storage, whose capacity is the specific amount and which has stored the specific plug-in module, is insufficient to further store the plug-in module being judged.

31. A computer-executable program, comprising instructions for:

judging whether a plug-in module is required for specific contents; and deleting a specific plug-in module having been stored in a memory storage when a specific amount of the memory storage, whose capacity is the specific amount and which has stored the specific plug-in module, is insufficient to further store the plug-in module being judged.

32. A computer-readable storage medium having a computer-executable program, comprising instructions for:

judging whether a plug-in module is required for specific contents; and deleting a specific plug-in module having been stored in a memory storage when a specific amount of the memory storage, whose capacity is the specific amount and which has stored the specific plug-in module, is insufficient to further store the plug-in module being judged.

33. A communications apparatus, comprising:

a receiving unit to receive data, the receiver unit including a processing unit;

wherein said processing unit to determine whether a first application is necessary to allow a user to display received data, and to delete at least a portion of at least one alternative application, previously stored in memory, in response to determining that said first application is necessary and that addition of said first application to the memory would exceed memory capacity;

wherein said at least a portion of at least one alternative application being deleted in accordance with deletion priority data including at least a last use threshold, said deletion priority data including a threshold relating to one of either a usage frequency, a usage frequency during a predetermined time period threshold, an application download time, an application size, an application download fee, a received data display history, a common processing threshold, and an authority to use an application threshold.

34. The apparatus of claim 33, wherein said communications apparatus being either of a computer and wireless device, the wireless device being either of a personal digital assistant, a cellular phone, and a wireless navigation device.

* * * * *